(12) United States Patent
Sun et al.

(10) Patent No.: US 9,969,116 B2
(45) Date of Patent: May 15, 2018

(54) CONTAINER AND PROCESS FOR MAKING THE SAME

(71) Applicant: Berry Plastics Corporation, Evansville, IN (US)

(72) Inventors: David Dezhou Sun, Evansville, IN (US); Philip A Driskill, Newburgh, IN (US); Jeffrey C Minnette, Evansville, IN (US); Birju A Surti, Ronks, PA (US); Anthony R Guarnera, Sayreville, NJ (US); Jonathan K Williams, Lancaster, PA (US)

(73) Assignee: Berry Plastics Corporation, Evansville, IN (US)

( * ) Notice: Subject to any disclaimer, the term of this patent is extended or adjusted under 35 U.S.C. 154(b) by 586 days.

(21) Appl. No.: 14/475,266

(22) Filed: Sep. 2, 2014

(65) Prior Publication Data

US 2015/0061193 A1    Mar. 5, 2015

Related U.S. Application Data

(60) Provisional application No. 61/872,260, filed on Aug. 30, 2013, provisional application No. 61/872,368, (Continued)

(51) Int. Cl.
*B29C 49/22* (2006.01)
*B29C 49/04* (2006.01)
(Continued)

(52) U.S. Cl.
CPC .............. *B29C 49/22* (2013.01); *B29B 11/10* (2013.01); *B29C 47/0023* (2013.01); (Continued)

(58) Field of Classification Search
CPC ...................................................... B29C 49/22
See application file for complete search history.

(56) References Cited

U.S. PATENT DOCUMENTS

| 3,221,954 A | 12/1965 | Lux |
| 3,290,198 A | 12/1966 | Lux |

(Continued)

FOREIGN PATENT DOCUMENTS

| CN | 1484602 | 3/2004 |
| CN | 1984763 | 6/2007 |

(Continued)

OTHER PUBLICATIONS

Australian Patent Examination Report for Australian App. No. 2014239318 dated Nov. 25, 2016, 4 pages.

(Continued)

*Primary Examiner* — Larry Thrower
(74) *Attorney, Agent, or Firm* — Barnes & Thornburg LLP

(57) ABSTRACT

A vessel is configured to hold a product in an interior region formed in the vessel. The vessel includes an inner layer arranged to define the interior region and an outer layer. The vessel is formed using a blow-molding process in which a multiple layer parison is blow molded to form the vessel. The multiple layer parison is formed in an extrusion process in which a number of extruders are arranged to co-extrude associated.

15 Claims, 11 Drawing Sheets

Related U.S. Application Data filed on Aug. 30, 2013, provisional application No. 61/872,183, filed on Aug. 30, 2013.

(51) Int. Cl.

| | | |
|---|---|---|
| *B29C 49/00* | (2006.01) | |
| *B29C 49/46* | (2006.01) | |
| *B29C 47/56* | (2006.01) | |
| *B29C 47/00* | (2006.01) | |
| *B29C 47/06* | (2006.01) | |
| *B29B 11/10* | (2006.01) | |
| B29K 23/00 | (2006.01) | |
| B29L 31/00 | (2006.01) | |
| B29C 49/42 | (2006.01) | |
| B29K 105/04 | (2006.01) | |
| B29C 49/48 | (2006.01) | |
| B29C 49/62 | (2006.01) | |

(52) U.S. Cl.
CPC ........ *B29C 47/0054* (2013.01); *B29C 47/065* (2013.01); *B29C 47/56* (2013.01); *B29C 49/0005* (2013.01); *B29C 49/04* (2013.01); *B29C 49/46* (2013.01); *B29B 2911/14166* (2013.01); *B29C 49/4252* (2013.01); *B29C 49/4817* (2013.01); *B29C 2049/4608* (2013.01); *B29C 2049/627* (2013.01); *B29C 2791/006* (2013.01); *B29C 2791/007* (2013.01); *B29K 2023/065* (2013.01); *B29K 2105/04* (2013.01); *B29K 2995/0063* (2013.01); *B29L 2031/712* (2013.01)

(56) References Cited

U.S. PATENT DOCUMENTS

| | | |
|---|---|---|
| 3,892,828 A | 7/1975 | Weatherly |
| 3,981,412 A | 9/1976 | Asmus |
| 4,047,868 A | 9/1977 | Kudo |
| 4,206,166 A | 6/1980 | Hayashi |
| 4,220,730 A | 9/1980 | Coyne |
| 4,264,672 A | 4/1981 | Taylor-Brown |
| 4,435,344 A | 3/1984 | Iioka |
| 4,479,989 A | 10/1984 | Mahal |
| 4,867,664 A | 9/1989 | Fukuhara |
| 4,990,382 A | 2/1991 | Weissenstein |
| 5,037,285 A | 8/1991 | Kudert |
| 5,055,022 A | 10/1991 | Hirschberger |
| 5,328,651 A | 7/1994 | Gallagher |
| 5,332,121 A | 7/1994 | Schmidt |
| 5,405,667 A | 4/1995 | Heider |
| 5,574,074 A | 11/1996 | Zushi |
| 5,575,965 A | 11/1996 | Caronia |
| 5,598,940 A | 2/1997 | Finkelstein |
| 5,601,200 A | 2/1997 | Finkelstein |
| 5,628,453 A | 5/1997 | MacLaughlin |
| 5,688,572 A | 11/1997 | Slat |
| 5,916,926 A | 6/1999 | Cooper |
| 5,927,525 A | 7/1999 | Darr |
| 5,952,423 A | 9/1999 | Shang |
| 6,053,214 A | 4/2000 | Sjoberg et al. |
| 6,221,925 B1 | 4/2001 | Constant |
| 6,284,810 B1 | 9/2001 | Burnham |
| 6,323,251 B1 | 11/2001 | Perez |
| 6,432,525 B1 | 8/2002 | Gokuraku |
| 6,444,149 B1 | 9/2002 | Valentinsson |
| 6,593,384 B2 | 7/2003 | Anderson |
| 6,616,434 B1 | 9/2003 | Burnham |
| 6,706,223 B1 | 3/2004 | Anderson |
| 6,811,843 B2 | 11/2004 | DeBraal |
| 6,875,484 B1 | 4/2005 | Kogure |
| 6,921,571 B2 | 7/2005 | Funakoshi |
| 6,986,922 B2 | 1/2006 | Hesse |
| 7,014,801 B2 | 3/2006 | Imanari |
| 7,169,338 B2 | 1/2007 | Imanari |
| 7,462,307 B2 | 12/2008 | Hesse |
| 7,588,808 B2 | 9/2009 | Hutchinson |
| 7,588,810 B2 | 9/2009 | Semersky |
| 7,704,440 B2 | 4/2010 | Brandner |
| 7,759,267 B2 | 7/2010 | Conover |
| 7,871,558 B2 | 1/2011 | Merical |
| 7,973,100 B2 | 7/2011 | Wada |
| 8,061,540 B2 | 11/2011 | Toyoda |
| 8,061,541 B2 | 11/2011 | Trumpp |
| 8,124,203 B2 | 2/2012 | Semersky |
| 8,137,600 B2 | 3/2012 | Pierick |
| 8,263,198 B2 | 9/2012 | Carvell |
| 8,342,420 B2 | 1/2013 | Roberts, Jr. |
| 8,397,932 B2 | 3/2013 | Ichikawa |
| 8,414,823 B2 | 4/2013 | Rudiger |
| 8,435,615 B2 | 5/2013 | Tsuchida |
| 8,535,598 B2 | 9/2013 | Imanari |
| 9,447,248 B2 | 9/2016 | Sun |
| 2002/0006975 A1 | 1/2002 | Welsh |
| 2002/0122905 A1 | 9/2002 | Andersson |
| 2002/0172739 A1 | 11/2002 | Anderson |
| 2003/0021927 A1* | 1/2003 | Boenig ............... B29C 49/22 428/36.5 |
| 2003/0114594 A1 | 6/2003 | Starita |
| 2004/0013830 A1 | 1/2004 | Nonomura |
| 2004/0062885 A1 | 4/2004 | Imanari |
| 2004/0147625 A1 | 7/2004 | Dostal |
| 2005/0009973 A1 | 1/2005 | Lee |
| 2006/0091576 A1 | 5/2006 | Takase |
| 2006/0142495 A1 | 6/2006 | Lalho |
| 2006/0205833 A1 | 9/2006 | Martinez |
| 2008/0114131 A1 | 5/2008 | Harris |
| 2008/0125547 A1 | 5/2008 | Swogger |
| 2008/0246193 A1 | 10/2008 | Smits |
| 2008/0261016 A1 | 10/2008 | Tamada |
| 2010/0196641 A1 | 8/2010 | DeVos |
| 2010/0215879 A1 | 8/2010 | Dooley |
| 2010/0227092 A1 | 9/2010 | Semersky |
| 2010/0282759 A1 | 11/2010 | Eckhardt |
| 2011/0129656 A1 | 6/2011 | Zur |
| 2011/0172363 A1 | 7/2011 | Share |
| 2011/0180509 A1 | 7/2011 | Hutchinson |
| 2011/0250384 A1 | 10/2011 | Sumi |
| 2012/0024459 A1 | 2/2012 | Igarashi |
| 2012/0061886 A1 | 3/2012 | Sumi |
| 2012/0076965 A1 | 3/2012 | Silvers |
| 2012/0103858 A1 | 5/2012 | Schmidt |
| 2012/0318805 A1 | 12/2012 | Leser |
| 2012/0318859 A1 | 12/2012 | Leser |
| 2013/0026128 A1* | 1/2013 | Beck ............... B65D 1/44 215/382 |
| 2013/0052385 A1 | 2/2013 | Leser |
| 2013/0059102 A1 | 3/2013 | Torchio |
| 2013/0085244 A1 | 4/2013 | Zhao |
| 2013/0143975 A1 | 6/2013 | Cassidy |
| 2016/0089852 A1 | 3/2016 | Lindenfelzer |
| 2016/0355659 A1 | 12/2016 | Sun |

FOREIGN PATENT DOCUMENTS

| | | |
|---|---|---|
| CN | 102313084 | 1/2012 |
| CN | 102762350 | 10/2012 |
| EP | 1057608 | 4/2002 |
| EP | 1472087 | 4/2006 |
| EP | 1741744 | 1/2007 |
| EP | 0851805 | 12/2008 |
| EP | 1040158 | 4/2012 |
| EP | 1749635 | 9/2012 |
| EP | 2323829 | 10/2012 |
| EP | 2141000 | 2/2014 |
| JP | 4278340 | 10/1992 |
| JP | 04278340 | 10/1992 |
| JP | 2004137377 | 5/2004 |
| JP | 2012526006 | 10/2012 |
| WO | 2003066320 | 8/2003 |
| WO | 2010015673 | 2/2010 |

(56) References Cited

FOREIGN PATENT DOCUMENTS

| WO | 2012174567 | 12/2012 |
|---|---|---|
| WO | 2012174568 | 12/2012 |
| WO | 2013032552 | 3/2013 |

OTHER PUBLICATIONS

Chinese Office Action for Chinese App. No. 201480047976.2 dated Dec. 9, 2016, 11 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Chinese Office Action for Chinese App. No. 201480047578.0 dated Nov. 30, 2016, 10 pages.
U.S. Office Action dated Sep. 15, 2016 for U.S. Appl. No. 15/239,894; 8 pages.
International Search Report and Written Opinion dated Jul. 18, 2014, relating to International Application No. PCT/US2014/027551.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
Office Action dated May 11, 2015 for U.S. Appl. No. 14/331,066.
Australian First Examination Report for Australian App. No. 2014311414 dated Feb. 7, 2017, 3 pages.
Extended European Search Report for European App. No. 14823298.6 dated Jan. 25, 2017, 9 pages.
Office Action dated Feb. 16, 2017 for U.S. Appl. No. 15/239,894.
Cheng et al., "Improving processability of polyethylenes by radiation-induced long-chain branching," Radiation Physics and Chemistry, 78 (2009) pp. 563-566.
Chinese Office Action for Application Serial No. 201480021009.9, dated Jan. 22, 2017 including English language summary, 22 pages.
Chinese Office Action for Chinese App. No. 201480047978.1 dated Feb. 20, 2017, 14pages.
Office Action dated May 1, 2017 for U.S. Appl. No. 14/211,533.
Advisory Action dated Jun. 1, 2017 for U.S. Appl. No. 15/239,894; (pp. 1-6).
Extended European Search Report for European App. No. 14840353.8 dated Mar. 17, 2017, 6 pages.
Extended European Search Report for European App. No. 14838960.4 dated Mar. 17, 2017, 9 pages.
Extended European Search Report for European App. No. 14840262 dated Mar. 23, 2017, 8 pages.
New Zealand Examination Report for New Zealand Patent App. No. 712687 dated Mar. 30, 2017, 10 pages.
Office Action dated Apr. 21, 2017 for U.S. Appl. No. 14/475,411.
Taiwan Search Report for Taiwan Application No. 103109790 completed Apr. 20, 2017, 9 pages.
Extended European Search Report for European App. No. 14840734.9 dated Apr. 4, 2017, 10 pages.
Australian Examination Report for Australian App. No. 2014286957 dated May 2, 2017, 3 pages.
Office Action dated Jul. 10, 2017 for U.S. Appl. No. 15/239,894; (pp. 1-10).
Office Action dated Jul. 19, 2017 for U.S. Appl. No. 15/059,995; (pp. 1-10).
Chinese Office Action for Chinese App. No. 201480047578.0 dated Jul. 4, 2017, 5 pages.
Chinese Office Action for Chinese App. No. 201480047978.1 dated Jul. 21, 2017, 11 pages.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Unilever Launches Breakthrough Packaging Technology That Uses 15% Less Plastic, Unilever (Apr. 24, 2014), http://www.unilever.com/mediacentre/pressreleases/2014/Unileverlaunches-breakthroughpackagingtechnologythatuses15lessplastic.aspx (2 pages).
Unilever Says It Will Use Less Plastic Per Bottle, Yahoo News (Apr. 22, 2014, 10:20 AM), http://news.yahoo.com/unilever-says-less-plastic-per-bottle-142039401--finance.html (3 pages).
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.
Office Action dated Mar. 21, 2017 for U.S. Appl. No. 14/475,411.
Chinese Office Action for Application Serial No. 201480021009.9, dated Aug. 7, 2017 including English language summary, 12 pages.
Cheng et al., "Improving processability of polyethylenes by radiation-induced long chain branching," Radiation Physics and Chemistry 79 (2009) 563-566.
International Search Report and Written Opinion related to International Application No. PCT/US2014/053666 dated Oct. 29, 2014.
Chinese Office Action for Chinese App. No. 201480047976.2 dated Aug. 22, 2017, 15 pages.
Dongwu Yang, Plastic Material Selection Technology, Light Industry Press, Jan. 2008, 1 page.
Office Action dated Oct. 6, 2017 for U.S. Appl. No. 15/383,115; (pp. 1-5).
Office Action dated Oct. 3, 2017 for U.S. Appl. No. 15/491,443; (pp. 1-6).

* cited by examiner

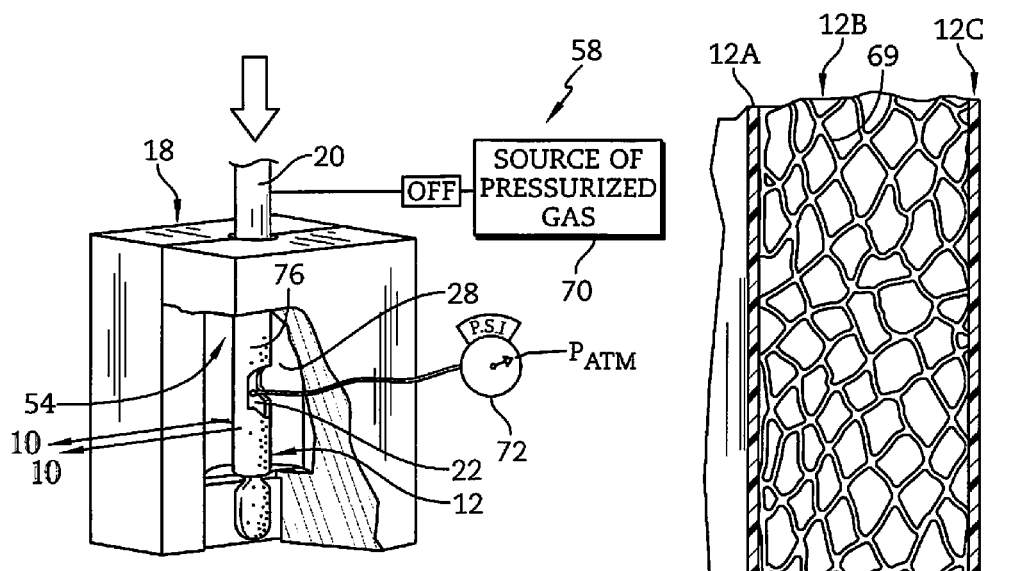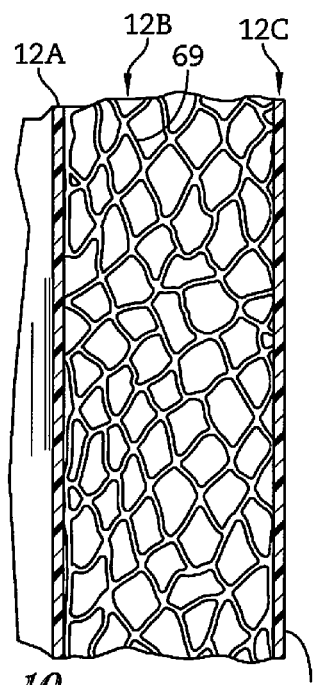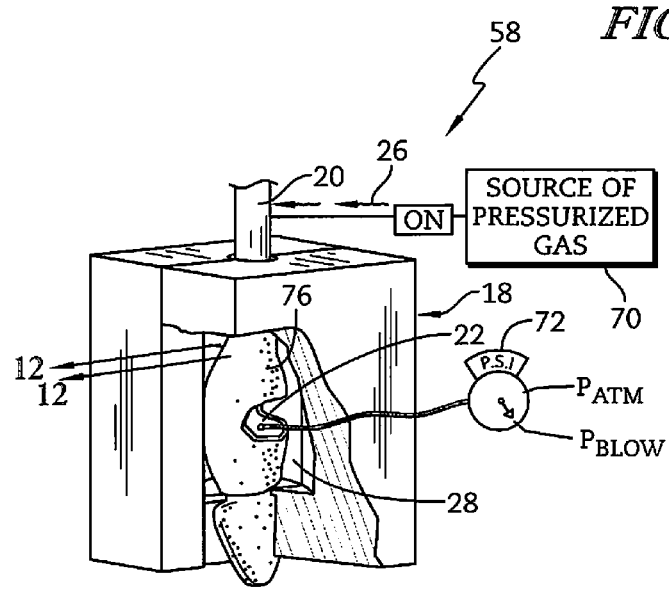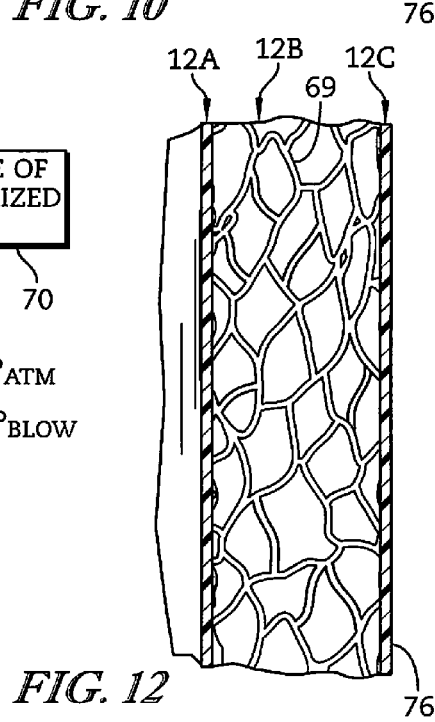
FIG. 9
FIG. 10
FIG. 11
FIG. 12

CONTAINER AND PROCESS FOR MAKING THE SAME

PRIORITY CLAIM

This application claims priority under 35 U.S.C. § 119(e) to U.S. Provisional Application Ser. No. 61/872,260, filed Aug. 30, 2013, U.S. Provisional Application Ser. No. 61/872,368, filed Aug. 30, 2013, and U.S. Provisional Application Ser. No. 61/872,183, filed Aug. 30, 2013, each of which is expressly incorporated by reference herein.

BACKGROUND

The present disclosure relates to containers, and in particular to containers made from polymeric materials. More particularly, the present disclosure relates containers made using a blow-molding process.

SUMMARY

According to the present disclosure, a container is formed to include an interior region adapted to store products therein. The container is made using a container-molding process in which a tube of polymeric materials is extruded and then blow molded.

In illustrative embodiments, a container-molding process is used to establish a multi-layer container from a multi-layer tube. The container-molding process includes an extruding operation, a blow-molding operation, and a trimming operation. During the extruding operation, a co-extrusion system co-extrudes a multi-layer tube that comprises an inner layer, an outer layer spaced apart from the inner layer, and a core layer located therebetween. The core layer is made from relatively low-density insulative cellular non-aromatic polymeric materials. During the blow-molding operation, the multi-layer tube is located in a mold and pressurized gas is pumped into a spaced formed in the multi-layer tube to cause the multi-layer tube to expand and take on a shape of the mold so that a vessel is established. During the trimming operation, excess materials are removed from the vessel to establish the multi-layer container.

In illustrative embodiments, the multi-layer container includes an inner layer, an outer layer spaced apart from the inner layer, and a compressed core layer located therebetween. The compressed core layer is made from relatively low-density insulative cellular non-aromatic polymeric material which has been compressed during the blow-molding operation. As a result, the multi-layer container has a relatively low density while stack strength, rigidity, and top load performance are maximized. The low density of the multi-layer container also minimizes an amount of polymeric material used to form the multi-layer container.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic and perspective view of a container-molding process in accordance with the present disclosure showing that the container-molding process includes an extruding operation in which a multi-layer tube is extruded from a co-extrusion system, a closing operation in which a mold is closed around the multi-layer tube, an inserting operation in which a blow needle is inserted into a tube space formed in the multi-layer tube while vacuum is applied to the mold, a pumping operation in which pressurized gas is pumped into tube space, an expanding operation in which the pressurized gas expands the multi-layer tube against an inner surface of the mold, an opening operation in which the mold is opened and a vessel is released, and a trimming operation in which excess material is trimmed from the vessel to establish a multi-layer container in accordance with the present disclosure as suggested in FIG. 13;

FIG. 2 is a diagrammatic view of the container-molding process of FIG. 2 showing that the container-molding process includes a series of operations which produce the multi-layer tube and form the multi-layer container;

FIG. 3 is a perspective and diagrammatic view of the co-extrusion system used to make the multi-layer tube showing that the co-extrusion system includes an outer-layer extruder configured to receive an outer-layer formulation and provide an outer-layer parison, an inner-layer extruder configured to receive an inner-layer formulation and provide an inner-layer parison, a core-layer extruder configured to receive a core-layer formulation and provide a core-layer parison, and a co-extrusion die coupled to each of the extruders to receive the associated parisons and configured to extrude the inner-layer, core-layer, and outer-layer parisons to establish the multi-layer tube;

FIG. 9 is a view similar to FIG. 7 showing the mold and multi-layer tube after the inserting operation in which the blow needle is inserted through the mold and into the tube space of the multi-layer tube and that a pressurized source of gas is turned off so that a pressure in the space is about atmospheric;

FIG. 10 is sectional view taken along line 10-10 of FIG. 9 showing that prior to the blowing operation, the core layer of the multi-layer tube includes a plurality of expanded cells filled with gas which cause a density of the core layer to be minimized so that a density of the of the multi-layer container is also minimized;

FIG. 11 is view similar to FIG. 9 showing the mold and multi-layer tube during the expanding operation in which the source of pressurized gas has been turned on causing pressure in the tube space to increase to $P_{BLOW}$ which is above atmospheric pressure so that the multi-layer tube expands outwardly toward the inner surface of the mold;

FIG. 12 is a view similar to FIG. 10 taken along line 12-12 of FIG. 11 showing that during the expanding operation, the plurality of expanded cells remain intact in the core layer so that the density of the vessel is minimized;

Figure 13:
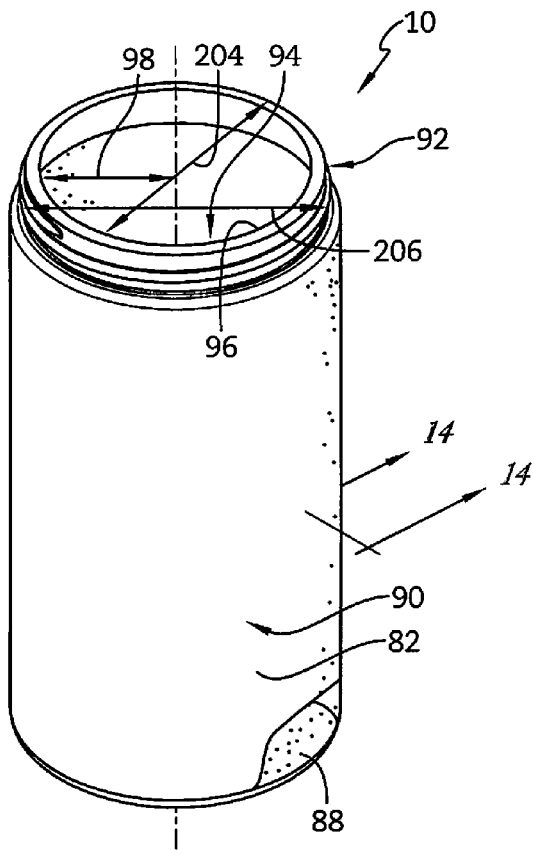
FIG. 13 is a perspective view of the multi-layer container formed from the container-molding process of FIGS. 1 and 2 after the trimming operation has completed.
Figure 14:
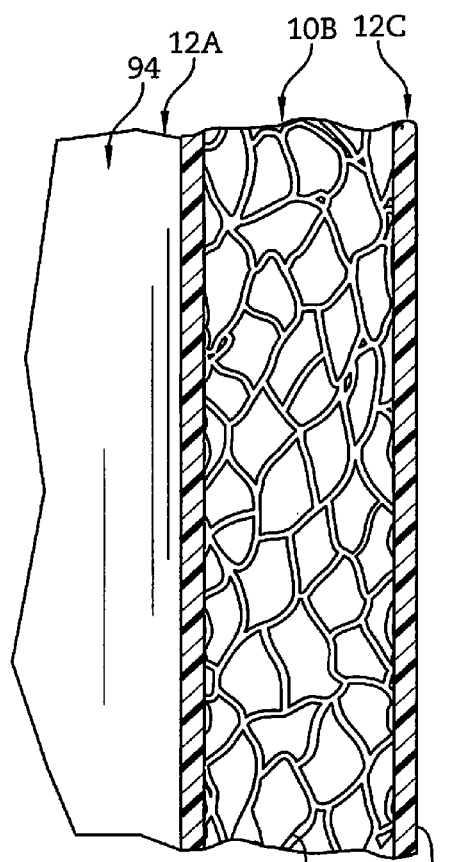
Figure 15:
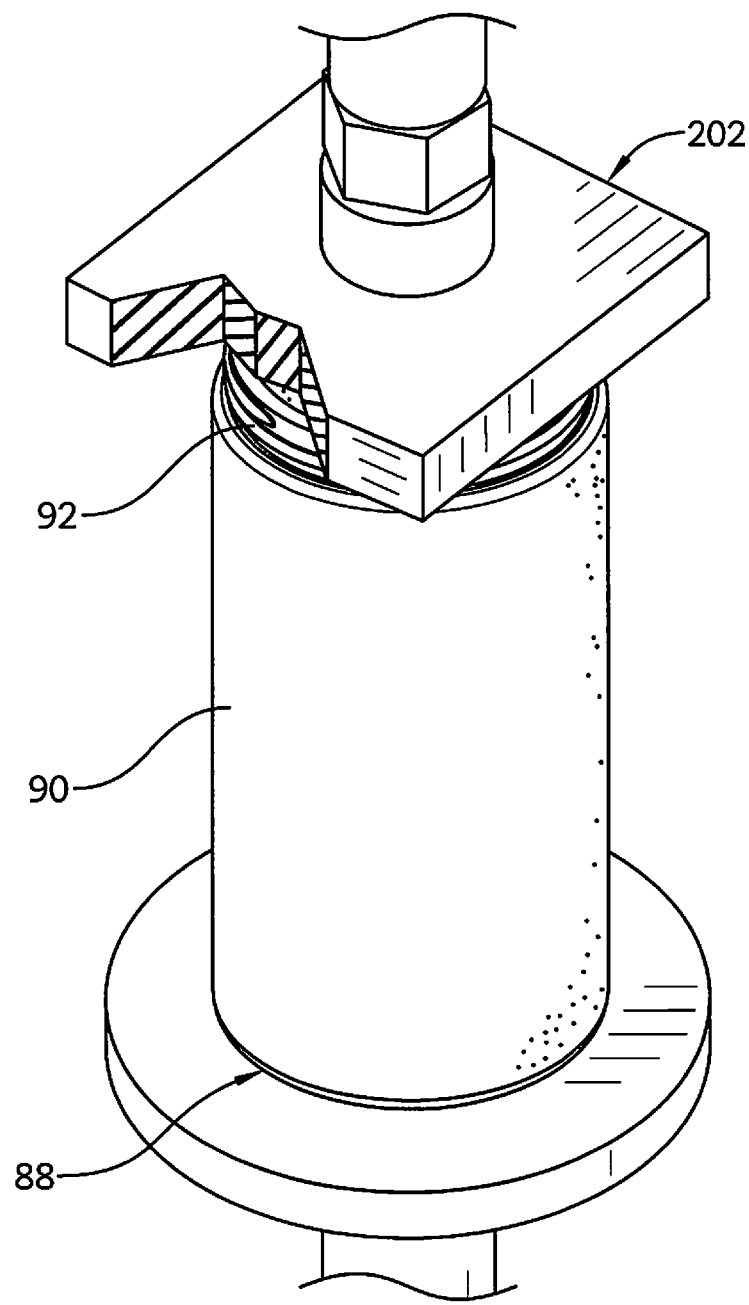
Figure 16:
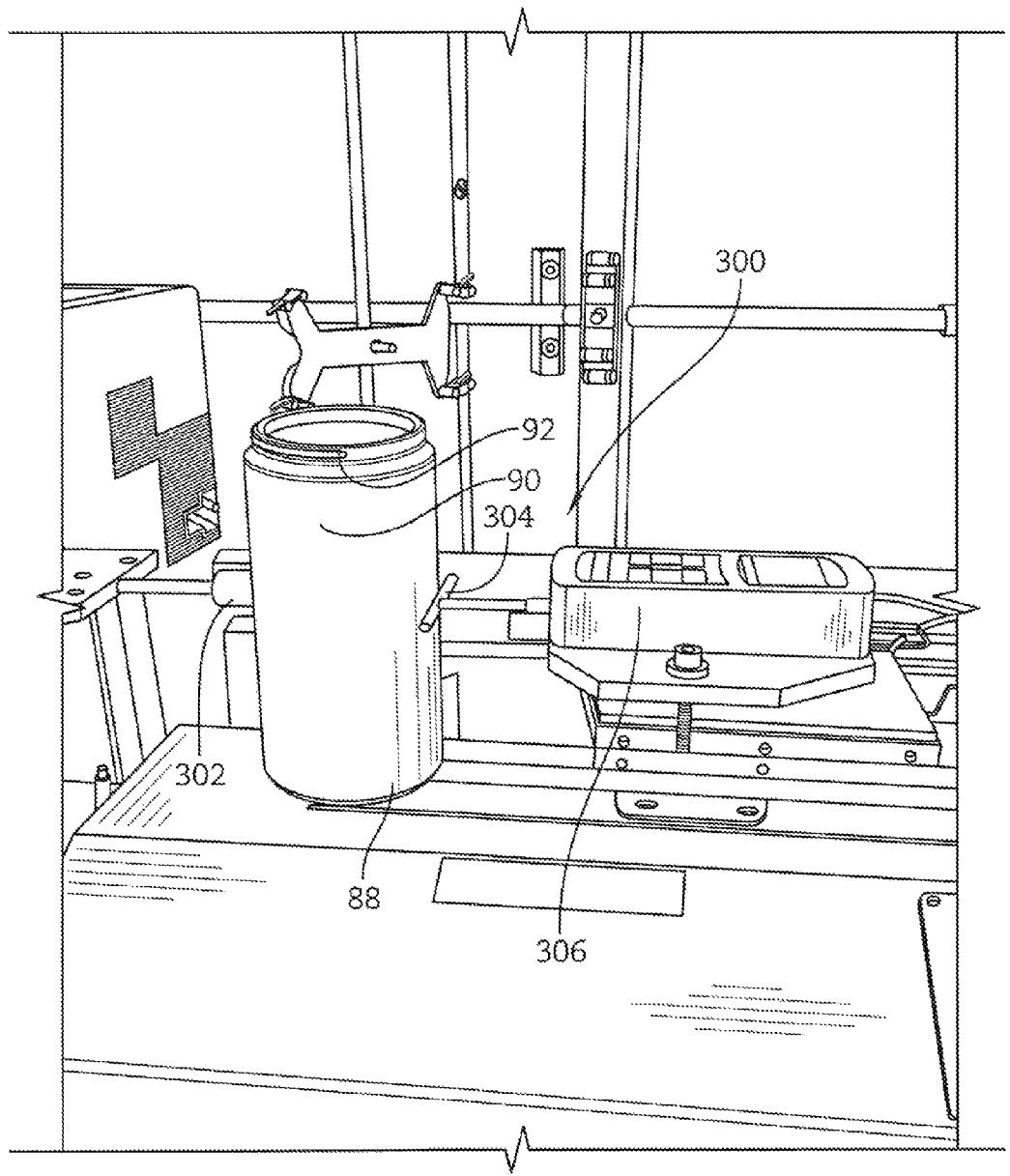
Figure 17:
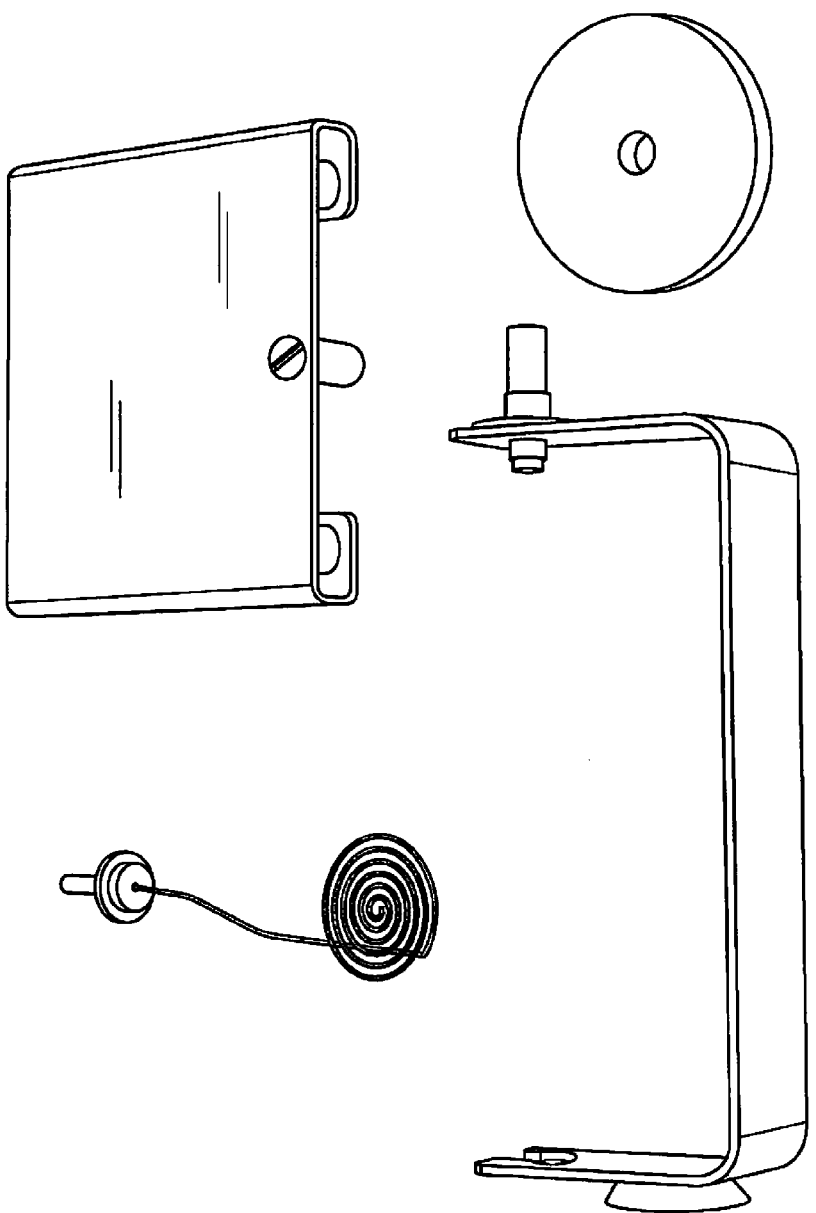

FIG. 14 is a sectional view taken along line 14-14 of FIG. 13 showing that the multi-layer container includes a side wall including the inner layer, the outer layer spaced apart from the inner layer, and a compressed core layer located therebetween and showing that some of the expanded cells have collapsed along the inner and outer layers to cause the compressed core layer to have a relatively greater density than the core layer of the multi-form tube;

FIG. 15 is a partial perspective view of the multi-layer container of FIG. 13 coupled to a top-load testing device undergoing top-load testing;

FIG. 16 is a photograph of the multi-layer container of FIG. 13 coupled to a rigidity testing device undergoing rigidity testing; and FIG. 17 is a perspective view of an unassembled density determination apparatus showing the components (clockwise starting in the upper left) gem holder, platform, suspension bracket, and suspension spacer.

DETAILED DESCRIPTION

Figure 1:
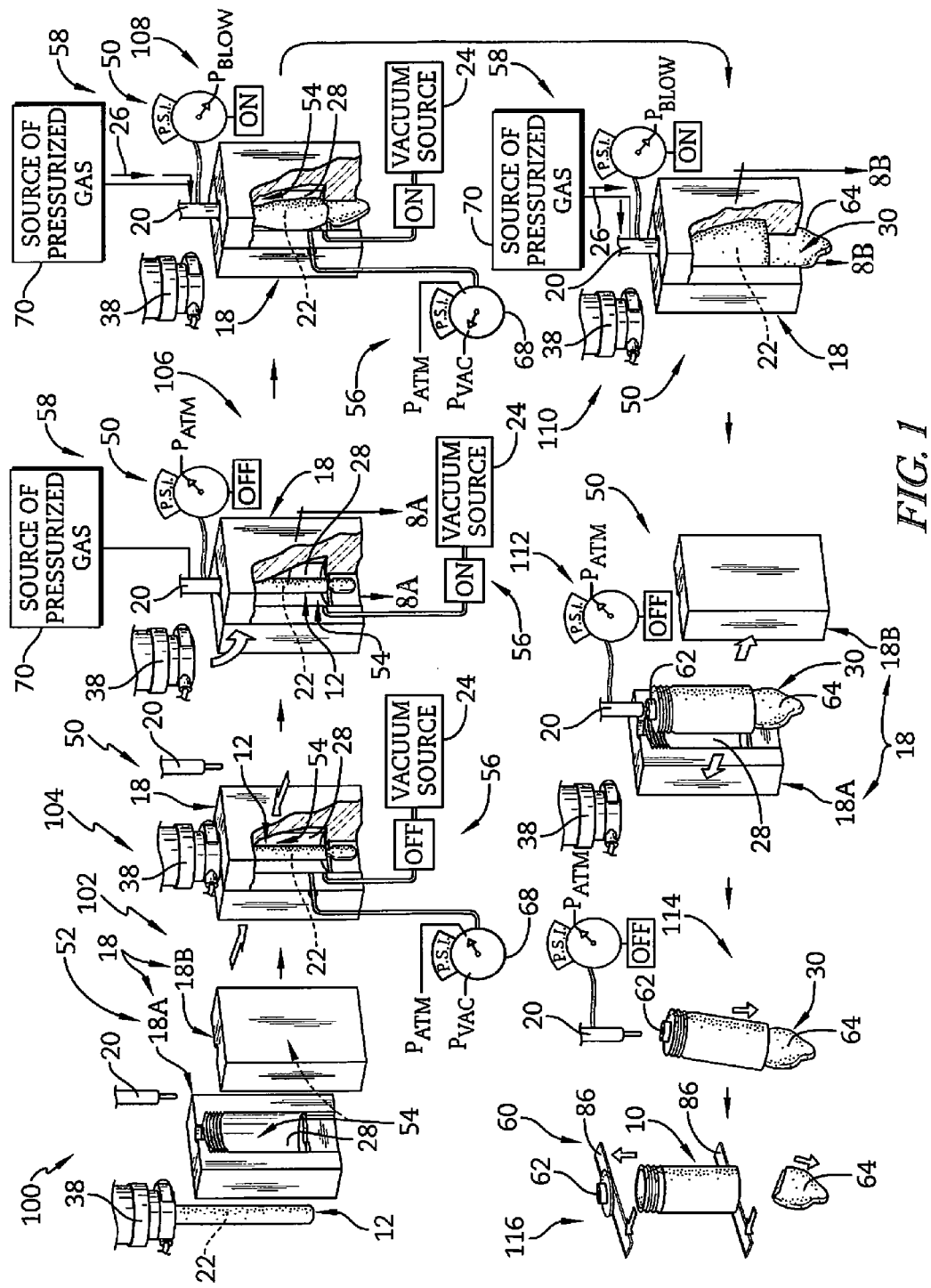

A multi-layer container 10 in accordance with the present disclosure is suggested in FIG. 1 and shown in FIG. 13. Multi-layer container 10 is formed by a container-molding process 100 in accordance with the present disclosure as shown in FIG. 1 and suggested in FIG. 2. Container-molding process 100 begins with extruding 102 a multi-layer tube 12 that includes a core layer 12B made from relatively low-density insulative cellular non-aromatic polymeric material. Container-molding process 100 proceeds by molding multi-layer tube 12 into multi-layer container 10 which may cause core layer 12B of multi-layer tube 12 to compress and establish a compressed core layer 10B included in multi-layer container 10. As a result of compressed core layer 10B being made from relatively low-density insulative cellular non-aromatic polymeric material, a density of multi-layer container 10 is minimized while stack strength, rigidity, and top-load performance of multi-layer container 10 are maximized.

Figure 3:
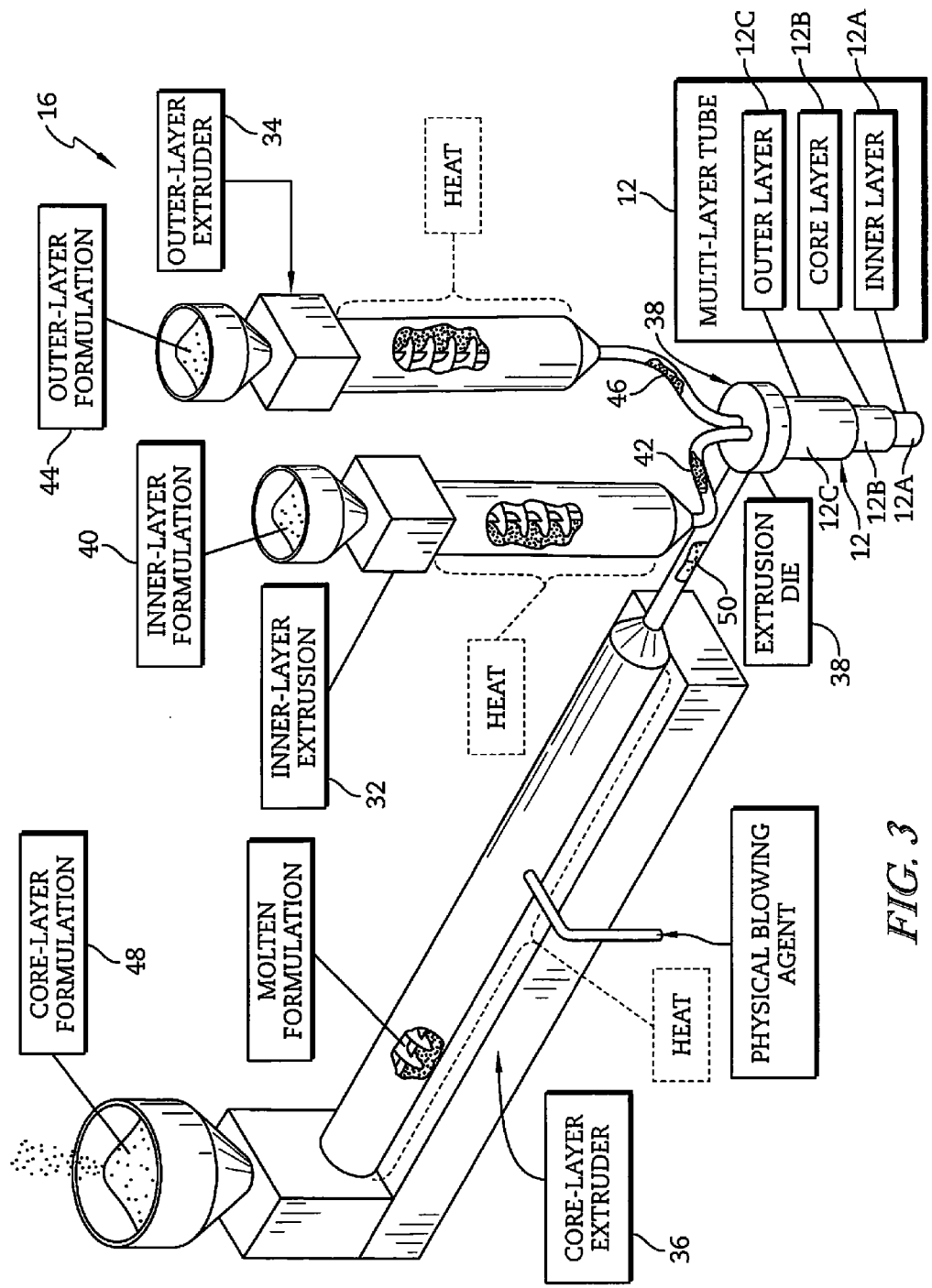

Container-molding process 100 begins with an extruding operation 102 in which multi-layer tube 12 is extruded from a co-extrusion system 16 as suggested in FIG. 1 and shown in FIG. 3. Container-molding process 100 then proceeds to a closing operation 104 in which a mold 18 is closed around multi-layer tube 12 as shown in FIG. 1. Container-molding process then moves onto an inserting operation 106 in which a blow needle 20 is inserted into a tube space 22 formed in multi-layer tube 12 while vacuum from a vacuum source 24 is applied to mold 18. Container-molding process 100 then proceeds to a pumping operation 108 in which pressurized gas 26 is pumped into tube space 22 as suggested in FIG. 1. Container-molding process 100 then moves on to simultaneous operations including a vacuuming operation 109 in which vacuum is applied to mold 18 and an expanding operation 110 in which pressurized gas 26 expands multi-layer tube 12 against an inner surface 28 of mold 18 and establishes a vessel 30. An opening operation 112 then occurs in which mold 18 opens to reveal vessel 30. Next, a removing operation 114 occurs in which vessel 30 is separated from mold 18 and released from blow needle 20. Container-molding process 100 then ends with a trimming operation 116 in which excess materials 62, 64 are trimmed from multi-layer container 10 to establish multi-layer container 10 as suggested in FIG. 1 and shown in FIG. 13.

Multi-layer container 10 is made during container-molding process 100 using multi-layer tube 12 as shown in FIG. 1. Multi-layer tube 12 is provided during extruding operation 102 of container-molding process 100. Extruding operation 102 is performed using co-extrusion system 16 as shown in FIG. 3. Extruding operation 102 includes a preparing stage 102A in which various material formulations are provided to co-extrusion system 16, an extrusion stage 102B in which the various material formulations are processed by co-extrusion system 16 to provide associated parisons, and a co-extruding stage 102C in which the various parisons are extruded to provide multi-layer tube 12 as shown in FIG. 1 and suggested in FIG. 3. Reference is hereby made to U.S. Provisional Application Ser. No. 61/872,260, filed Aug. 30, 2013 and titled MULTI-LAYER TUBE AND PROCESS FOR MAKING THE SAME and U.S. application Ser. No. 14/475,411, filed Sep. 2, 2014 and titled MULTI-LAYER TUBE AND PROCESS FOR MAKING THE SAME for disclosure relating to an extruding operation, which application is hereby incorporated in its entirety.

Figure 4:
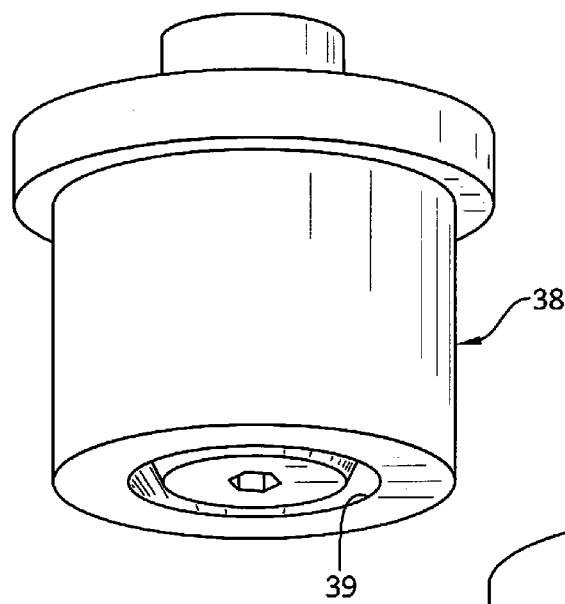
FIG. 4 is a partial perspective view taken from below the co-extrusion die of the co-extrusion system showing that the co-extrusion die includes an annular aperture configured to extrude the multi-layer tube.
Figure 5:
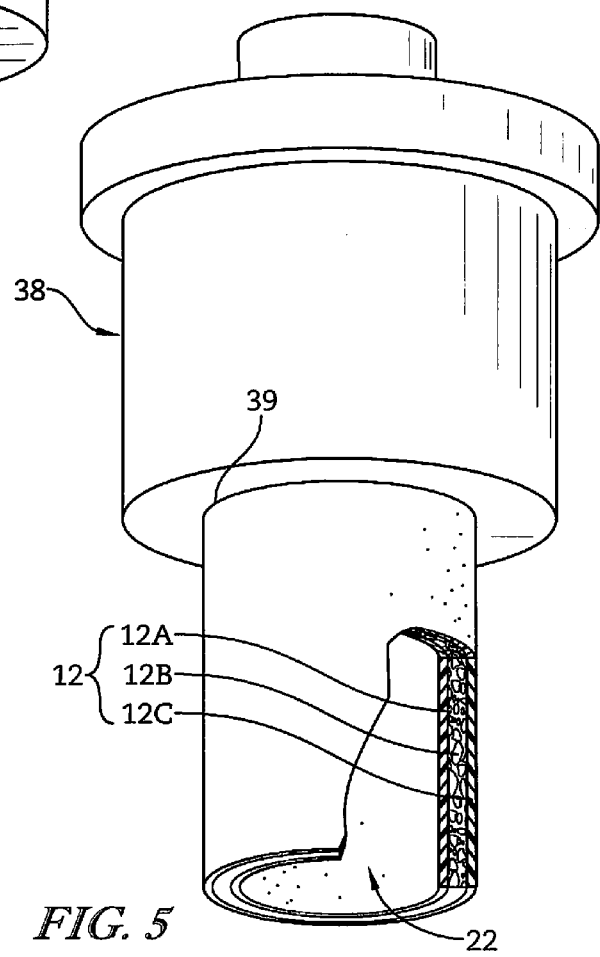
FIG. 5 is a view similar to FIG. 4 after co-extrusion of the multi-layer tube has begun with portions of the multi-layer tube broken away to reveal that the inner layer is spaced apart from the outer layer and that the core layer is located therebetween.
Figure 6:
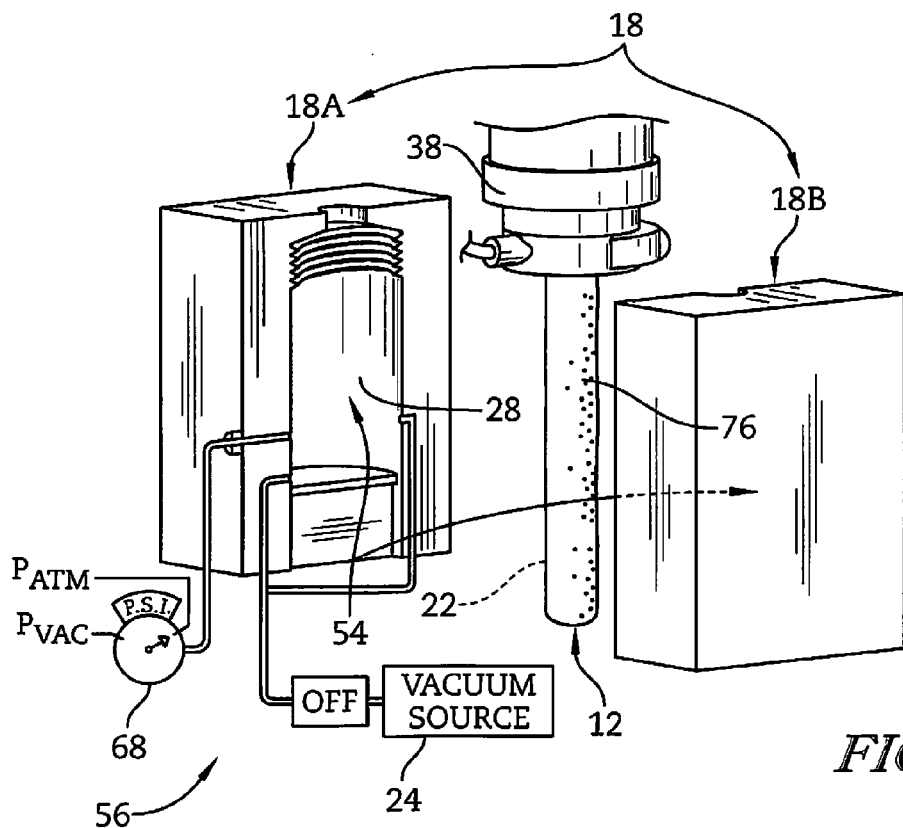
FIG. 6 is an enlarged partial perspective view of FIG. 1 showing that prior to the closing operation, the multi-layer tube is located between two mold halves and that a vacuum source coupled to the mold is turned off so that atmospheric pressure exists in a mold cavity formed between the two mold halves when the mold is in a closed position.
Figure 7:
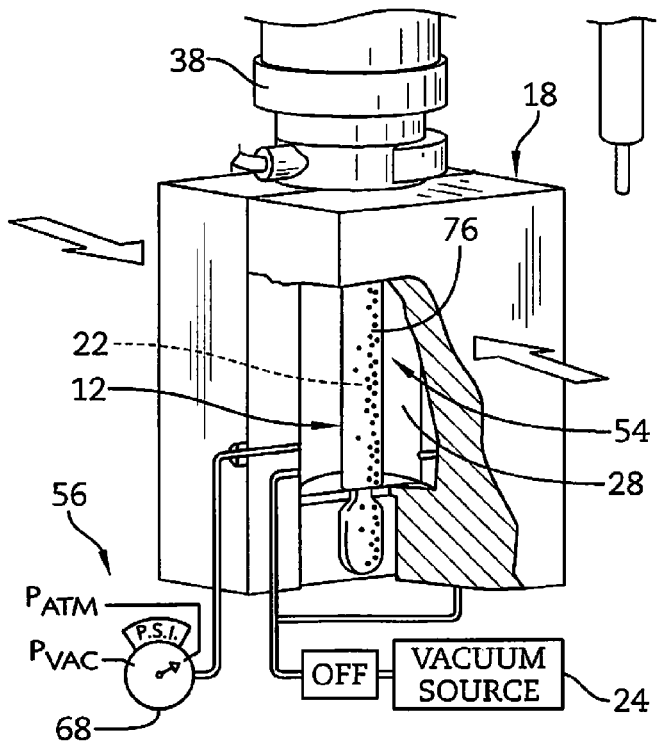
FIG. 7 is an enlarged partial perspective view of FIG. 1 showing that after the closing operation, the vacuum source is turned on and pressure inside the mold cavity decreases to establish a vacuum in the mold cavity which minimizes loss of cell structure in the core layer during the blowing and expanding operations.

Extruding operation 102 is performed on co-extrusion system 16 which includes an inner-layer extruder 32, an outer-layer extruder 34, a core-layer extruder 36, and a co-extrusion die 38 as shown in FIG. 3. Inner-layer extruder 32 receives an inner-layer formulation 40 of a relatively high-density polymeric material and processes inner-layer formulation 40 to provide an inner-layer parison 42 to co-extrusion die 38 as shown in FIG. 3. Outer-layer extruder 34 receives an outer-layer formulation 44 of a relatively high-density polymeric material and processes outer-layer formulation 44 to provide an outer-layer parison 46 to co-extrusion die 38 as shown in FIG. 3. Core-layer extruder 36 receives a core-layer formulation 48 of a relatively low-density insulative cellular non-aromatic polymeric material and processes core-layer formulation 48 to provide a core-layer parison 50 to co-extrusion die 38 as shown in FIG. 3. Co-extrusion die 38 receives the various parisons 42, 46, 50 and extrudes multi-layer tube 12 through an annular aperture 39 as suggested in FIGS. 1 and 3 and shown in FIGS. 4 and 5.

While extruding operation 102 is shown forming multi-layer tube 12 having three layers, any number of layers may be formed during the extruding operation. Additional layers may include relatively low-density layers, tie layers, thermoplastic polyurethane (TPU), other olefins, combinations thereof, or any other suitable alternatives and combinations.

Once extruding operation 102 is complete and multi-layer tube 12 is provided, container-molding process 100 proceeds to establish multi-layer container 10 using a molding system 52 as shown in FIG. 1. Molding system 52 includes, for example, mold 18 formed to include a mold cavity 54 defined by inner surface 28 of mold 18, a vacuum system 56 configured to provide a vacuum pressure to mold cavity 54 during molding of multi-layer container 10, a blowing system 58 configured to provide pressurized gas 26 to tube space 22, and a trimming system 60 configured to remove excess materials 62, 64 from vessel 30 as shown in FIG. 1.

Figure 2:
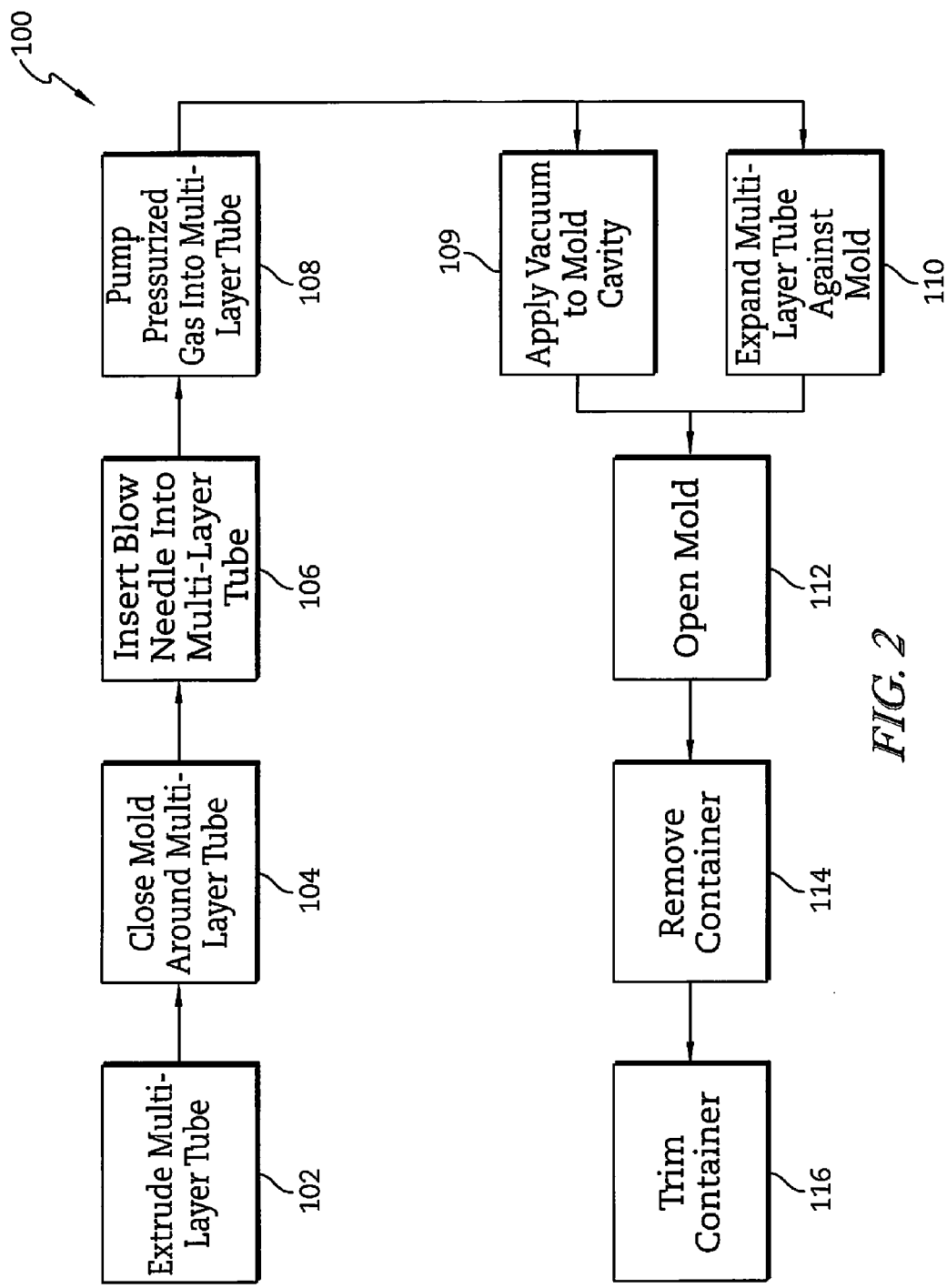

Container-molding process 100 proceeds to closing operation 104 after multi-layer tube 12 has been established as shown in FIGS. 1 and 2. First and second mold halves 18A, 18B included in mold 18 begin in an opened position in which mold halves 18A, 18B are spaced apart from one another as shown in FIG. 1. During closing operation 104, mold halves 18A, 18B move toward one another to achieve a closed position in which multi-layer tube 12 is located in mold cavity 54 formed therebetween. During closing operation 104, a vacuum source 66 included in vacuum system 56 remains off and pressure in mold cavity 54 remains at about atmospheric pressure as measured by a mold-cavity pressure gauge 68 as shown in FIG. 1.

Once mold 18 is in the closed position, container-molding process 100 proceeds to inserting operation 106 as shown in FIGS. 1 and 2. During inserting operation 106, mold 18 moves away from co-extrusion die 38 and aligns with blow needle 20 included in blowing system 58. Blow needle 20 then moves downwardly through mold 18 into tube space 22 included in multi-layer tube 12 as shown in FIGS. 1 and 2. At the same time, vacuum source 66 is turned on causing pressure in mold cavity 54 to decrease to $P_{VAC}$ which is below atmospheric pressure. Vacuum is applied at a pressure in a range of about 5 mmHg to about 25 mmHg. In another example vacuum is applied at a pressure of about 20 mmHg. As a result, $P_{VAC}$ is greater than the vacuum applied and less than atmospheric pressure. $P_{VAC}$ may be in a range of about 5 inches Hg to about 20 inches Hg. In another example, $P_{VAC}$ is in a range of about 10 inches Hg to about 20 inches Hg. In still yet another example, $P_{VAC}$ is about 10 inches Hg.

As a result of blow needle 20 being inserted into tube space 22, pressurized gas (e.g., air) provided by a source 70 of pressurized gas 26 included in blowing system 58 may be communicated into tube space 22 to expand a size of multi-layer tube 12 in subsequent operations. However, during inserting operation 106, source 70 of pressurized gas 26 is turned off and pressure in tube space 22 is measured by a tube pressure gauge 72 to be at about atmospheric pressure ($P_{ATM}$). Pressurized gas may be, for example, standard air, nitrogen, carbon dioxide, combinations thereof, or any other suitable alternative.

After blow needle 20 has been inserted into tube space 22, container-molding process 100 proceeds to pumping operation 108 as shown in FIGS. 1 and 2. During pumping operation 108, source 70 of pressurized gas 26 is turned on and pressure inside tube space 22 increases to a relatively higher pressure ($P_{BLOW}$). In one example, $P_{BLOW}$ is in a range of about 30 pounds per square inch and about 120 pounds per square inch. In another example, $P_{BLOW}$ is in a range of about 10 pounds per square inch to about 130 pounds per square inch. In yet another example, $P_{BLOW}$ is in a range of about 35 pounds per square inch to about 45 pounds per square inch. In still yet another example, $P_{BLOW}$ is about 40 pounds per square inch.

In another illustrative example, source 70 of pressurized gas 26 may be configured to deliver pressurized gas 26 at a temperature to tube space 22. In one example, the temperature is in a range of about 35 degrees Fahrenheit to about 75 degrees Fahrenheit. In another example, the temperature is in a range of about 40 degrees Fahrenheit to about 70 degrees Fahrenheit. In yet another example, the temperature is in a range of about 50 degrees to about 75 degrees Fahrenheit. In another example, the temperature is about room temperature. In another example, the temperature is about 40 degrees Fahrenheit. In still yet another example, the temperature is about 50 degrees Fahrenheit.

After pressurized gas 26 has begun to enter tube space 22 through blow needle 20, container-molding process 100 proceeds to both vacuuming operation 109 and expanding operation 110 as shown in FIGS. 1 and 2. During vacuuming operation 109, vacuum is applied to mold cavity 54. At the same time vacuuming operation 109 is ongoing, expanding operation 110 commences. During expanding operation 110, pressurized gas 26 continues to flow through blow needle 20 causing multi-layer tube 12 to expand and engage inner surface 28 of mold 18 and fill mold cavity 54 as suggested in FIG. 1 and FIG. 11. Expanding operation 110 is complete once multi-layer tube 12 has substantially the same shape as mold cavity 54. While expanding operation 110 is ongoing, vacuum source 66 remains on and pressure in mold cavity 54 remains below atmospheric pressure to minimize collapse and damage of expanded cells 69 included in core layer 12B of multi-layer tube 12 as shown in FIG. 12.

Figure 8A:
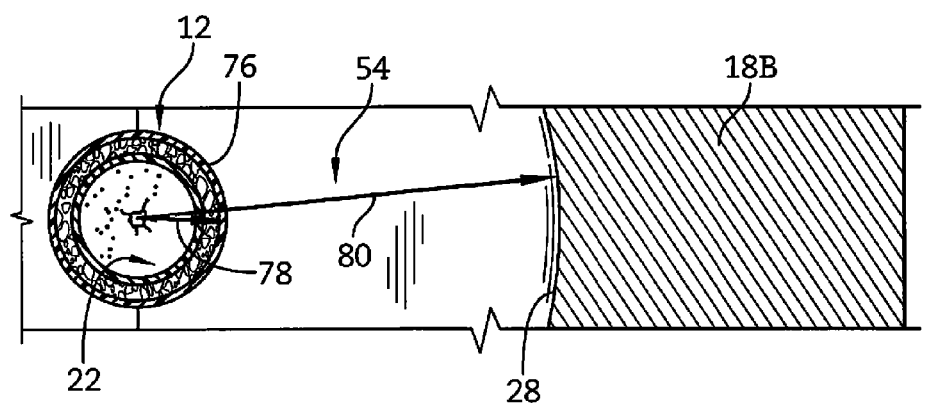
FIG. 8A is a sectional view taken along line 8A-8A of FIG. 7 showing that prior to the blowing operation, the multi-layer tube has an outer tube surface which establishes a pre-form radius and an inner surface of the mold has a relatively greater mold radius.
Figure 8B:
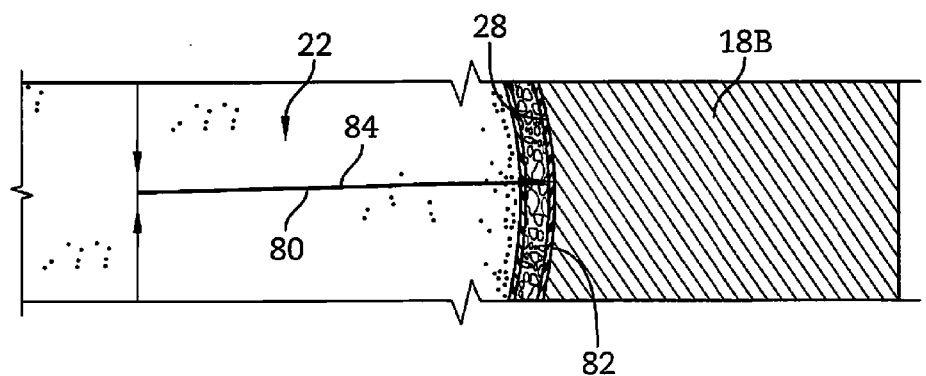
FIG. 8B is a view similar to FIG. 8A taken along line 8B-8B of FIG. 1 showing that the multi-layer tube has expanded to engage the inner surface of the mold after the expanding operation is complete and that the vessel includes an outer container surface which establishes a relatively greater container radius which is about equal to the mold radius.

Pumping operation 108, vacuuming operation, and expanding operation 110 cause multi-layer tube 12 to expand from a pre-expansion shape as shown in FIGS. 8A and 9 to a post-expansion shape shown in FIGS. 1 and 8B which is substantially similar to a shape of vessel 30. An outer tube surface 76 of multi-layer tube 12 has a pre-form radius 78 as shown in FIG. 8A Inner surface 28 of mold 18 has a relatively greater mold radius 80 as shown in FIG. 8A. As shown, for example, in FIG. 8B, vessel 30 has an outer container surface 82 which has a relatively greater container radius 84. Relatively greater container radius 84 is about equal to relatively greater mold radius 80 after expanding operation 110 is complete.

A blow-up ratio for mold 18 and multi-layer tube 12 is calculated by dividing mold radius 80 by pre-form radius 78. In one example, the blow-up ratio is in a range of about 100% to about 300%. In another example, the blow-up ratio is in a range of about 150% to about 200%. In still yet another example, the blow-up ratio is about 200%. The blow-up ratio may be adjusted to suit various sizes of containers.

After expanding operation 110 is complete, vessel 30 is established. Vessel 30 includes multi-layer container 10 and excess material 62 coupled to an upper end of multi-layer container 10 and excess material 64 coupled to a lower end of multi-layer container 10. Container-molding process 100 then proceeds to opening operation 112 as shown in FIGS. 1 and 2. During opening operation 112, source 70 of pressurized gas 26 is turned off and mold 18 moves from the closed position to the opened position as shown in FIG. 1. Vessel 30 is then ready for removal from mold 18 and while remaining coupled to blow needle 20 as suggested in FIG. 1.

Container-molding process 100 then proceeds to removing operation 114 in which vessel 30 is separated from mold 18 and released from blow needle 20. In one example, source 70 of pressurized gas 26 briefly turns on blowing vessel 30 off of blow needle 20.

Once vessel 30 is separated form mold 18 and blow needle 20, container-molding process 100 proceeds to trimming operation 116. During trimming operation 116, excess material 62, 64 is cut using one or more knives 86 or blades to provide multi-layer container 10 as shown in FIG. 1.

Molding system 52 is used in cooperation with a continuous extrusion process such as extruding operation 102. As suggested in FIG. 1, molding system 52 may be a shuttle blow-molding machine. In this example, mold 18 begins in the opened position and moves on a track toward co-extrusion die 38 to locate multi-layer tube 12 between mold halves 18A, 18B. Mold 18 then moves to the closed position. Mold 18 then slides away from co-extrusion die 18 while another multi-layer tube 12 is extruded. At the same time, inserting operation 106, pumping operation 108, and expanding operation 110 are performed. Opening operation 112 and removing operations 114 are then performed which cause vessel 30 to be ejected from mold 18. Mold 18 is now in the opened position ready to slide back toward co-extrusion die 30 and begin the process again. One example molding machine 52 is a shuttle blow-molding machine available from Graham Engineering Corporation of York, Pa. In another example of a shuttle blow-molding machine, more than one mold may be used to minimize cycle time and increase an extrusion rate of co-extrusion system 16.

In another example, molding machine 52 may be a rotary blow molding machine. In this example, a continuous multi-layer tube is extruded and a series of molds included in the rotary blow-molding machine rotate relative to the multi-layer tube. As molds approach co-extrusion die 38 forming the multi-layer tube 10, they begin to move from an opened arrangement to a closed arrangement trapping a portion of the multi-layer tube 10 in a mold cavity formed in the mold. As the molds move away from the co-extrusion die forming the multi-layer tube, pressurized gas is injected in the tube space expanding the multi-layer container. The molds then move from the closed position to an opened position where the vessel 30 is ejected from the mold cavity. One example of a rotary extrusion blow-molding machine is available from Wilmington Machinery of Wilmington, N.C.

Container-molding process 100 has a cycle time defined as an amount of time between closing operation 104 and opening operation 112. This cycle time is defined the same way whether molding machine 52 is a shuttle blow-molding machine or a rotary extrusion blow-molding machine. Multi-layer containers including core layer 12B made from relatively low-density insulative cellular non-aromatic polymeric material may have decreased cycle time due to reduced mass of the container resulting from the use of core-layer 12B.

In one example, the cycle time for container-molding process 100 and multi-layer container 10 on a shuttle blow-molding machine is in a range of about 5% to about 40% faster than molding operations and containers lacking a layer made from relatively low-density insulative cellular non-aromatic polymeric material. However, it is believed that similar cycle time improvements also occur when using a rotary extrusion blow-molding machine. In another example, cycle time may be in a range of about 5% to about 30% faster than molding operations and containers lacking a layer made from relatively low-density insulative cellular non-aromatic polymeric material. The cycle time of container-molding process 100 and multi-layer container 10 was about 16 seconds.

Container-molding process 100 uses multi-layer tube 12 to establish multi-layer container 10 as shown, for example, in FIGS. 1 and 13. Multi-layer container 10 includes a floor 88, a side wall 90, and neck 92 as shown in FIG. 13. Side wall 90 is relatively straight and vertical and provides outer container surface 82. Floor 88 is coupled to a lower end of side wall 90 and cooperates with side wall 90 to define an interior product-storage region 94 therebetween. Neck 92 is coupled to an opposite upper end of side wall 90 and defines an open mouth 96 that is arranged to open into interior product-storage region 94. Neck 92 has a neck radius 98 which is relatively smaller than container radius 84 as shown in FIG. 13.

Multi-layer container 10 was subjected to a series of performance tests which include drop testing, top load testing, rigidity testing, and metrology testing. Drop testing determines a likelihood of container survival due to a drop or impact to the container. Top load testing determines how much force a container can withstand before the container fails or necks in to form an hourglass shape. Rigidity testing determines how resistant containers are to deformation. Metrology testing determines dimensions of multi-layer container 10 in comparison to specifications for the container.

Multi-layer container 10 was subjected to drop testing according to one of the Plastic Bottle Institute Test for Drop Impact Resistance of Plastic Bottles, PBI 4-1968, Rev. 2-1988 test method and the Rigid Plastics Container Division of the Society of Plastics Industry, Inc. RPCD-7-1991 test method. Various runs of multi-layer container 10 were tested according to Rigid Plastics Container Division of the Society of Plastics Industry, Inc. RPCD-7-1991 test method and the results are shown below in Table 1.

In another example, the drop test may be performed according to the following procedure. The container is filled with water and closed off with, for example, a lid. The sample container is then held at about 73 degrees Fahrenheit (22.8 degrees Celsius) and about 50% relative humidity. The filled, capped containers are then subjected to the following procedure: (a) the filled, capped container is located at about five feet above a hard surface such as concrete or tile; (b) the filled, capped container is then oriented such that a bottom of the filled, capped container is arranged to lie in a substantially parallel relation to the hard surface; (c) each of ten capped, filled containers are dropped; (d) upon impact, each filled, capped container is examined for any break or shattering of the wall that causes water to leak out of the bottle; and (d) the total number of bottles showing any sign of leakage after the drop test are counted as failures. Results for various different trial runs of multi-layer container 10 are shown below in Table. 1.

TABLE 1

Drop Test Results for Various Multi-Layer Containers

| Trial Run Number | Failure Quantity | Total Quantity Tested |
| --- | --- | --- |
| 1 | 3 | 5 |
| 2 | 5 | 5 |
| 3 | 3 | 5 |
| 4 | 3 | 5 |
| 5 | 5 | 5 |
| 6 | 4 | 5 |
| 7 | 4 | 5 |
| 8 | 4 | 5 |
| 9 | 4 | 5 |
| 10 | 2 | 5 |
| 11 | 4 | 5 |
| 12 | 4 | 5 |
| 13 | 5 | 5 |
| 14 | 5 | 5 |
| 15 | 4 | 5 |
| 16 | 5 | 5 |

Various multi-layer containers 10 were also subjected to top load testing. An Instron tester 202 is used to determine top load performance as suggested in FIG. 15. Multi-layer containers 10 were tested until they failed or necked in to form an hourglass shape. Once failure or necking was observed, the value shown on Instron tester 202 was recorded. Table 2 shows the performance of several multi-layer containers including compressed core layer 10B tested vs. several high density polyethylene containers (excluding a core layer). Both types of containers had a total mass of about 56 grams.

TABLE 2

Top Load Test Results for Various Multi-Layer Containers

| Trial Run Number | Average Collapse Force (pounds-Force) | Percent Improvement over X1 |
|---|---|---|
| X1* | 108.85 | N/A |
| 1 | 133.77 | 23% |
| 2 | 148.68 | 37% |
| 3 | 131.65 | 21% |
| 4 | 140.12 | 29% |
| 5 | 140.93 | 29% |
| 6 | 145.11 | 34% |
| 7 | 145.96 | 34% |
| 8 | 115.25 | 6% |
| 9 | 118.46 | 9% |
| 14 | 131.16 | 20% |
| 15 | 132.32 | 22% |
| 16 | 144.45 | 33% |
| 17 | 169.2 | 55% |
| 18 | 133.6 | 23% |
| 19 | 152.4 | 40% |
| 20 | 121.04 | 11% |

*High density polyethylene container lacking a core layer made from relatively low-density insulative cellular non-aromatic polymeric material Various types of multi-layer containers 10 in accordance with the present disclosure survived top loads in a range of about 115 pounds-Force to about 170 pounds-Force. In another example, various types of multi-layer containers 10 in accordance with the present disclosure performed about 6% to about 55% better than comparable containers lacking the core layer.

Various multi-layer containers 10 in accordance with the present disclosure were subjected to rigidity testing. Each multi-layer container was placed in a rigidity tester as shown in FIG. 16 and tested to determine rigidity as shown below in Table 3. Testing involves placing a multi-layer container in a rigidity tester 300 as shown in FIG. 16 in two orientations. The rigidity tester includes a stationary cylindrical stop 302 on a left side and a movable anvil 304 and force gauge 306 on a right side. The movable anvil is generally T-shaped as shown in FIG. 16. For each orientation, side wall 90 of multi-layer container 10 is deformed about midway between floor 88 and neck 92 of multi-layer container 10. Side wall 90 is deformed about 0.25 inches over a 10 second interval and the force required to do so is recorded in pounds-Force. The first orientation places a mold seam of multi-layer container in alignment to engage movable anvil 304 (0 Degrees). The second orientation rotates multi-layer container 10 so that the seam is about 90 degrees away from the movable anvil (90 Degrees). 302

TABLE 3

Rigidity Test Results for Various Multi-Layer Containers

| Trial Run Number | Sidewall Rigidity - 0 Degrees (pounds-Force) | Sidewall Rigidity - 90 Degrees (pounds-Force) | Sidewall Rigidity - Average (pounds-Force) |
|---|---|---|---|
| X1* | 1.703 | 0.887 | 1.295 |
| 1 | 2.286 | 1.836 | 2.061 |
| 2 | 2.298 | 2.253 | 2.2755 |
| 3 | 2.231 | 1.741 | 1.986 |
| 4 | 2.309 | 1.857 | 2.083 |
| 5 | 2.555 | 1.845 | 2.2 |
| 6 | 2.25 | 1.841 | 2.0455 |
| 7 | 2.424 | 1.904 | 2.164 |
| 8 | 2.421 | 1.928 | 2.1745 |
| 9 | 2.203 | 1.775 | 1.989 |
| X2* | 2.081 | 0.974 | 1.5275 |
| 15 | 2.192 | 1.698 | 1.945 |
| 16 | 2.624 | 2.009 | 2.3165 |
| 17 | 3.029 | 2.551 | 2.79 |
| 18 | 2.765 | 2.434 | 2.5995 |
| 19 | 2.731 | 2.585 | 2.658 |
| 20 | 2.104 | 1.707 | 1.9055 |

*High density polyethylene container lacking a core layer made from relatively low-density insulative cellular non-aromatic polymeric material Various multi-layer containers 10 were also subjected to metrology measurements to determine accuracy and repeatability of container-molding process 100 to manufacture multi-layer containers 10 to specification. Table 4 below shows a neck diameter 204 measured at different points along a multi-layer container for several multi-layer containers along with the specified values and limits for each multi-layer container. The measurements were taken at 0 degrees (part line of the mold), 90 degrees (counter-clockwise from the part line), 45 degrees (counter-clockwise from the part line), 135 degrees (counter-clockwise from the part line), average neck diameter, and ovality of the neck. Ovality is the difference between highest and lowest neck diameter measurements.

TABLE 4

Neck Diameter Values for Various Runs of Multi-Layer Containers

| Trial Run Number | 0 Degree Value (inches) | 90 Degree Value (inches) | 45 Degree Value (inches) | 135 Degree Value (inches) | Average Value (inches) | Ovality |
|---|---|---|---|---|---|---|
| Spec. Dimension | 3.4940 | 3.4940 | 3.4940 | 3.4940 | 3.4940 | .090 Max. |
| Spec. Tolerance | +/−.017 | +/−.017 | +/−.017 | +/−.017 | +/−.017 | |
| 1 | 3.5719 | 3.5605 | 3.4200 | 3.4337 | 3.4965 | 0.1534 |
| 2 | 3.4603 | 3.4181 | 3.4669 | 3.5091 | 3.4636 | 0.0964 |
| 3 | 3.5697 | 3.5657 | 3.4261 | 3.4332 | 3.4987 | 0.1442 |
| 4 | 3.5675 | 3.5667 | 3.4159 | 3.4110 | 3.4903 | 0.1609 |
| 5 | 3.5700 | 3.5671 | 3.4136 | 3.4085 | 3.4898 | 0.1721 |
| 6 | 3.5658 | 3.5636 | 3.4105 | 3.4121 | 3.4880 | 0.1583 |
| 7 | 3.5655 | 3.5729 | 3.4129 | 3.4030 | 3.4886 | 0.1701 |
| 8 | 3.5847 | 3.5599 | 3.3980 | 3.4136 | 3.4890 | 0.1866 |
| 9 | 3.4960 | 3.4951 | 3.5072 | 3.5054 | 3.5009 | 0.0169 |
| 14 | 3.5949 | 3.5315 | 3.3871 | 3.4449 | 3.4896 | 0.2078 |
| 15 | 3.5941 | 3.5441 | 3.3895 | 3.4362 | 3.4910 | 0.2046 |
| 17 | 3.5739 | 3.5332 | 3.3857 | 3.4135 | 3.4766 | 0.1882 |

TABLE 4-continued

Neck Diameter Values for Various Runs of Multi-Layer Containers

| Trial Run Number | 0 Degree Value (inches) | 90 Degree Value (inches) | 45 Degree Value (inches) | 135 Degree Value (inches) | Average Value (inches) | Ovality |
|---|---|---|---|---|---|---|
| 18 | 3.4864 | 3.4774 | 3.4559 | 3.4557 | 3.4689 | 0.0425 |
| 19 | 3.4551 | 3.4126 | 3.4997 | 3.5088 | 3.4690 | 0.1032 |
| 20 | 3.5039 | 3.4888 | 3.4710 | 3.4749 | 3.4846 | 0.0392 |
| 21 | 3.5661 | 3.4777 | 3.4235 | 3.5062 | 3.4934 | 0.1427 |

Various multi-layer containers 10 were subjected to metrology measurements to determine accuracy and repeatability of container-molding process 100 to manufacture multi-layer containers 10 to specification. Table 5 below shows a thread diameter 206 measured at different points along a multi-layer container for several multi-layer containers along with the specified values and limits for each multi-layer container. The measurements were taken at 0 degrees (part line of the mold), 90 degrees (counter-clockwise from the part line), 45 degrees (counter-clockwise from the part line), 135 degrees (counter-clockwise from the part line), average neck diameter, and ovality of the neck. Ovality is the difference between highest and lowest thread diameter measurements.

TABLE 5

Thread Diameter Values for Various Runs of Multi-Layer Containers

| Trial Run Number | 0 Degree Value (inches) | 90 Degree Value (inches) | 45 Degree Value (inches) | 135 Degree Value (inches) | Average Value (inches) | Ovality |
|---|---|---|---|---|---|---|
| Spec. Dimension | 3.3740 | 3.3740 | 3.3740 | 3.3740 | 3.3740 | .090 Max. |
| Spec. Tolerance | +/−.017 | +/−.017 | +/−.017 | +/−.017 | +/−.017 | |
| 1 | 3.4508 | 3.4409 | 3.2993 | 3.3196 | 3.3777 | 0.1528 |
| 2 | 3.3417 | 3.3075 | 3.3447 | 3.3946 | 3.3471 | 0.0954 |

TABLE 5-continued

Thread Diameter Values for Various Runs of Multi-Layer Containers

| Trial Run Number | 0 Degree Value (inches) | 90 Degree Value (inches) | 45 Degree Value (inches) | 135 Degree Value (inches) | Average Value (inches) | Ovality |
|---|---|---|---|---|---|---|
| 3 | 3.4504 | 3.4483 | 3.3063 | 3.3209 | 3.3815 | 0.1455 |
| 4 | 3.4477 | 3.4484 | 3.2963 | 3.2991 | 3.3729 | 0.1566 |
| 5 | 3.4485 | 3.4479 | 3.2946 | 3.2970 | 3.3720 | 0.1652 |
| 6 | 3.4462 | 3.4455 | 3.2911 | 3.3005 | 3.3708 | 0.1573 |
| 7 | 3.4448 | 3.4530 | 3.2942 | 3.2910 | 3.3708 | 0.1644 |
| 8 | 3.4651 | 3.4401 | 3.2785 | 3.3021 | 3.3715 | 0.1867 |
| 9 | 3.3822 | 3.3808 | 3.3840 | 3.3914 | 3.3846 | 0.0133 |
| 14 | 3.4732 | 3.4141 | 3.2679 | 3.3318 | 3.3717 | 0.2054 |
| 15 | 3.4732 | 3.4273 | 3.2706 | 3.3239 | 3.3737 | 0.2026 |
| 17 | 3.4530 | 3.4135 | 3.2667 | 3.3001 | 3.3583 | 0.1863 |
| 18 | 3.3667 | 3.3620 | 3.3333 | 3.3415 | 3.3509 | 0.0422 |
| 19 | 3.3330 | 3.2997 | 3.3778 | 3.3882 | 3.3497 | 0.0954 |
| 20 | 3.3841 | 3.3712 | 3.3483 | 3.3586 | 3.3656 | 0.0384 |
| 21 | 3.4449 | 3.3594 | 3.3025 | 3.3900 | 3.3742 | 0.1423 |

Various multi-layer containers 10 were subjected to metrology measurements to determine accuracy and repeatability of container-molding process 100 to manufacture multi-layer containers 10 to specification. Table 6 below shows various measurements taken for several multi-layer containers along with the specified values and limits for each multi-layer container. The measurements taken were an Overall Height (OAH) of the container, an outside diameter of the side wall taken at 0 degrees (part line of the mold) and 90 degrees (counter-clockwise from the part line), an average outside diameter, ovality of the diameter, weight of the container, OFC. OFC is an overflow capacity of multi-layer container 10 and measured in cubic centimeters (cc).

TABLE 6

Metrology Body Values for Various Runs of Multi-Layer Containers

| Trial Run Number | OAH (inches) | 0 Deg. Value (inches) | 90 Deg. Value (inches) | Average Value (inches) | Ovality | Weight (g) | OFC (cc) |
|---|---|---|---|---|---|---|---|
| Spec. Dimension | 7.5970 | 3.7110 | 3.7110 | 3.7110 | .090 Max. | 80.0000 | 1225.3000 |
| Spec. Tolerance | +/−.047 | +/−.047 | +/−.047 | +/−.047 | | +/−3.500 | +/−12.900 |
| 1 | 7.5387 | 3.7282 | 3.6762 | 3.7022 | 0.0520 | 55.5033 | 1217.4150 |
| 2 | 7.5083 | 3.6977 | 3.6602 | 3.6790 | 0.0375 | 55.5000 | * |
| 3 | 7.5518 | 3.7333 | 3.6668 | 3.7001 | 0.0665 | 56.0433 | 1233.1400 |
| 4 | 7.5482 | 3.7303 | 3.6628 | 3.6966 | 0.0675 | 57.2567 | 1224.2700 |
| 5 | 7.5372 | 3.7277 | 3.6534 | 3.6906 | 0.0743 | 57.9767 | 1218.6800 |
| 6 | 7.5415 | 3.7321 | 3.6537 | 3.6929 | 0.0784 | 56.3967 | 1216.5367 |
| 7 | 7.5394 | 3.7301 | 3.6577 | 3.6939 | 0.0724 | 57.5567 | 1210.1567 |
| 8 | 7.5431 | 3.7365 | 3.6518 | 3.6942 | 0.0847 | 56.9300 | 1216.0400 |
| 9 | 7.5814 | 3.7240 | 3.7028 | 3.7134 | 0.0212 | 54.3667 | 1259.6100 |
| 14 | 7.5309 | 3.7276 | 3.6700 | 3.6988 | 0.0576 | 55.4033 | 1212.4733 |
| 15 | 7.5307 | 3.7306 | 3.6666 | 3.6986 | 0.0640 | 56.0200 | 1216.4100 |
| 17 | 7.5197 | 3.7317 | 3.6905 | 3.7111 | 0.0520 | 56.7133 | 1190.3700 |
| 18 | 7.5157 | 3.7132 | 3.7110 | 3.7121 | 0.0754 | 55.7967 | * |
| 19 | 7.5263 | 3.7236 | 3.6370 | 3.6803 | 0.0866 | 56.4967 | 1165.9950 |
| 20 | 7.5438 | 3.7457 | 3.6322 | 3.6890 | 0.1135 | 53.5700 | 1219.2850 |
| 21 | 7.5469 | 3.7351 | 3.6617 | 3.6984 | 0.0734 | 56.8267 | 1222.3133 |

*Value not available as multi-layer container leaked

Various multi-layer containers 10 were subjected to metrology measurements to determine accuracy and repeatability of container-molding process 100 to manufacture multi-layer containers 10 to specification. Table 7 below shows various thicknesses for each inner, outer, and core layer for several multi-layer containers. Table 8 shows various layer thicknesses as a percent of a total thickness for each inner, outer, and core layer and a layer distribution between solid (inner and outer layer) cellular (core layer) for several multi-layer containers. In one example, a total solid phase distribution of inner and outer layers is targeted at about 12-15% while a cellular phase distribution is targeted about 85-88% as suggested in Table 8 below.

TABLE 7

Layer Thicknesses for Various Runs of Multi-Layer Containers

| Trial Run Number | Inner Layer (mils) | Compressed Core Layer (mils) | Outer Layer (mils) |
|---|---|---|---|
| 1 | 3.6 | 48.8 | 1.6 |
| 2 | 3.0 | 50.6 | 1.9 |
| 3 | 3.6 | 42.2 | 1.6 |
| 4 | 3.7 | 49.3 | 1.3 |
| 5 | 3.9 | 49.3 | 7.9 |
| 6 | 4.4 | 46.8 | 3.6 |
| 7 | 5.9 | 45.5 | 2.1 |
| 8 | 5.1 | 52.2 | 2.1 |
| 9 | 2.7 | 51.5 | 1.7 |
| 14 | 4.1 | 46.1 | 3.4 |
| 15 | 4.4 | 50.4 | 1.9 |
| 17 | 5.4 | 51.4 | 2.9 |
| 18 | 5.6 | 65.6 | 5.0 |
| 19 | 6.7 | 72.3 | 5.8 |
| 20 | 5.9 | 48.1 | 6.4 |
| 21 | 5.4 | 43.6 | 5.1 |

TABLE 8

Layer Analysis for Various Runs of Multi-Layer Containers

| Trial Run Number | Inner Layer (%) | Compressed Core Layer (%) | Outer Layer (%) | Solid Phase Distribution (%) | Cellular Phase Distribution (%) |
|---|---|---|---|---|---|
| 1 | 6.6% | 90.5% | 2.9% | 9.5% | 90.5% |
| 2 | 5.5% | 91.1% | 3.5% | 8.9% | 91.1% |
| 3 | 7.6% | 89.0% | 3.4% | 11.0% | 89.0% |
| 4 | 6.9% | 90.8% | 2.3% | 9.2% | 90.8% |
| 5 | 6.4% | 80.7% | 12.9% | 19.3% | 80.7% |
| 6 | 8.0% | 85.4% | 6.6% | 14.6% | 85.4% |
| 7 | 11.0% | 85.0% | 3.9% | 15.0% | 85.0% |
| 8 | 8.6% | 87.9% | 3.5% | 12.1% | 87.9% |
| 9 | 4.8% | 92.1% | 3.1% | 7.9% | 92.1% |
| 14 | 7.7% | 86.0% | 6.3% | 14.0% | 86.0% |
| 15 | 7.8% | 88.9% | 3.3% | 11.1% | 88.9% |
| 17 | 9.0% | 86.1% | 4.9% | 13.9% | 86.1% |
| 18 | 7.4% | 86.0% | 6.6% | 14.0% | 86.0% |
| 19 | 7.9% | 85.3% | 6.9% | 14.7% | 85.3% |
| 20 | 9.7% | 79.6% | 10.6% | 20.4% | 79.6% |
| 21 | 9.9% | 80.7% | 9.4% | 19.3% | 80.7% |

Multi-layer container 10 is made using container-molding process 100 which begins with an extruding operation 102 as shown in FIGS. 1-3. Extruding operation 102 includes several stages that each comprise several operations which cooperate to provide multi-layer tube 12. As suggested in FIG. 3, extruding operation 102 includes a preparing stage 102A in which various material formulations are prepared and provided to each associated extruder to provide the associated layer of multi-layer tube 12. Extruding operation 102 further includes an extrusion stage 102B in which the various formulations are processed by associated extruders to provide associated parisons which are communicated to co-extrusion die 38 as shown in FIGS. 1 and 3. Finally, extruding operation 102 ends with a co-extruding stage 102C in which the various parisons are aligned and co-extruded together to establish multi-layer tube 12.

As suggested in FIG. 3, preparing stage 102A of extruding operation 102 includes a first preparing operation 102A1 in which an inner-layer formulation 40 is prepared and provided to inner-layer extruder 32 as shown in FIG. 3. In one example, inner-layer formulation 40 comprises at least one polymeric material. The polymeric material may include one or more resins. In one example, inner-layer formulation 40 includes a relatively high-density polymeric material. In another example, inner-layer formulation 40 comprises relatively high-density polymeric material. In yet another example, inner-layer formulation 40 is FORMOLENE® HB5502F HDPE hexene copolymer (available from Formosa Plastics Corporation).

In another example, inner-layer formulation 40 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

Preparing stage 102A of extruding operation 102 further includes a second preparing operation 102A2. During second preparing operation 102A2, outer-layer formulation 44 is prepared and provided to outer-layer extruder 34 as shown in FIG. 3. In one example, outer-layer formulation 44 comprises at least one polymeric material. The polymeric material may include one or more resins. In one example, inner-layer formulation 40 includes a relatively high-density polymeric material. In another example, inner-layer formulation 40 comprises relatively high-density polymeric material. In yet another example, inner-layer formulation 40 is FORMOLENE® HB5502F HDPE hexene copolymer (available from Formosa Plastics Corporation).

In another example, outer-layer formulation 44 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In some examples, inner-layer formulation 40 and outer-layer formulation 44 may be the same. In other examples, inner-layer formulation 40 and outer-layer formulation 44 may be different. In still yet other example, additional layers may be included and configured to be an oxygen barrier such as Ethylene Vinyl Alcohol (EVOH), a ultra-violet light barrier, and the like. The additional layers or alternative layers may include other relatively low-density layers, tie layers, TPU layers, other olefins, combinations thereof, or any other suitable combinations and alternatives.

Preparing stage 102A of extruding operation 102 further includes a third preparing operation 102A3 in which core-layer formulation 48 is prepared and provided to core-layer extruder 36 as shown in FIG. 3. Core-layer formulation 48 is an insulative cellular non-aromatic polymeric material. Reference is hereby made to U.S. application Ser. No. 14/331,066, filed Jul. 14, 2014 and titled POLYMERIC MATERIAL FOR CONTAINER for disclosure relating to possible material formulations.

In one example, core-layer formulation 48 comprises a polyethylene base resin and one or more cell-forming agents. Core-layer formulation 48 uses a polyethylene-based formulation to produce insulative cellular non-aromatic polymeric material after being processed through core-layer extruder 36. Core-layer formulation 48 is heated in core-layer extruder 36 where a cell-forming agent is introduced into the molten core-layer formulation prior to moving the materials from core-layer extruder 36 to co-extrusion die 38. As molten core-layer formulation 48 exits co-extrusion die 38 between inner and outer layers 12A, 12C, cells nucleate in the molten material and the material expands to form core layer 12B made from insulative cellular non-aromatic polymeric material.

In one exemplary embodiment, core-layer formulation 48 used to produce the insulative cellular non-aromatic polymeric material includes at least one polymeric material. The polymeric material may include one or more base resins. In one example, the base resin is High Density Polyethylene (HDPE). In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron beam modified to provide long chain branching and a melt index of about 0.25 g/10 min. Another example a unimodal, high-melt strength HDPE is EQUISTAR® ALATHON® H5520 HDPE copolymer (available from Lyondell Chemical Company) which has been electron beam modified to have long-chain branching and a melt index of about 0.25 g/10 min. Another example of a suitable unimodal HDPE is FORMOLENE® HB5502F HDPE hexene copolymer (available from Formosa Plastics Corporation).

In certain exemplary embodiments, core-layer formulation 48 may include two base resins that are HDPE. One illustrative example of core-layer formulation 48 includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, core-layer formulation 48 may include both e-beam modified EQUISTAR® ALATHON® H5520 and FORMOLENE® HB5502F HDPE. In such an embodiment the EQUISTAR® ALATHON® H5520 provides higher melt strength which increases foaming potential, and has less flexural modulus or brittleness. The FORMOLENE® HB5502F HDPE provides wide unimodal polydispersity index or distribution and maximizes economic advantage.

In another example, core-layer formulation 48 includes about 50% e-beam modified EQUISTAR® ALATHON® H5520 and about 50% FORMOLENE® HB5502F HDPE. Together the combination provides a film having drop resistance capability associated with a non-modified HDPE resin and increased melt strength of an e-beam modified long-chain branched HDPE. Depending on the desired characteristics, the percentage of two HDPE copolymers may be varied, e.g., 25%/75%, 30%/70%, 35%/65%, 40%/60%, 45%/55%, 50%/50%, etc. In an embodiment, core-layer formulation 48 includes three HDPE copolymers in the base resin. Again, depending on the desired characteristics, the percentage of three HDPE copolymers can be varied, 33%/33%/33%, 30%/30%/40%, 25%/25%/50%, etc.

A core-layer formulation can include one or more base resins. The amount of HDPE base resin may be one of several different values or fall within one of several different ranges. It is within the scope of the present disclosure to select an amount of HDPE base resin and be one of the following values: about 85%, 90%, 95%, 97%, 98%, 99%, 99.5%, and 99.9% of the total formulation by weight percentage. It is within the scope of the present disclosure for the amount of HDPE base resin in the formulation to fall within one of many different ranges. In a first set of ranges, the range of HDPE base resin is one of the following ranges: about 85% to 99.9%, 86% to 99.9%, 87% to 99.9%, 87.5% to 99.9%, 88% to 99.9%, 89% to 99.9%, 90% to 99.9%, 91% to 99.9%, 92% to 99.9%, 93% to 99.9%, 94% to 99.9%, 95% to 99.9%, 96% to 99.9%, 96.5% to 99.9%, 97% to 99.9%, and 98% to 99.9% of the total formulation by weight percentage. In a second set of ranges, the range of HDPE base resin is one of the following ranges: about 85% to 99.5%, 85% to 99%, 85% to 98%, 85% to 97%, 85% to 96%, 85% to 96.5%, 85% to 95%, 85% to 94%, 85% to 93%, 85% to 92%, 85% to 91%, 85% to 90%, 85% to 89%, 85% to 88%, 85% to 87%, and 85% to 86% of the total formulation by weight percentage. In a third set of ranges, the range of HDPE base resin is one of the following ranges: about 87.5% to 96.5%, 87.5% to 96%, 87.5% to 95.5%, 87.5% to 95%, 95% to 99%, 95.5% to 99%, 96% to 99%, and 96.5% to 99% of the total formulation by weight percentage. Each of these values and ranges is embodied in the Examples.

Long chain branching refers to the presence of polymer side chains (branches) that have a length that is comparable or greater than a length of the backbone to which the polymer side chains are coupled to. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 centi-Newton while other similar PP resins lacking long chain branching have a melt strength of less than about 10 centi-Newton.

Core-layer formulation 48 used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

A core-layer formulation can include a physical nucleating agent. The amount of a physical nucleating agent may be one of several different values or fall within one of several different ranges. It is within the scope of the present disclosure to select an amount of a physical nucleating agent and be one of the following values: about 0%, 0.1%, 0.25%, 0.5%, 0.75%, 1.0%, 1.25%, 1.5%, 1.75%, 2%, 2.25%, 2.5%, 3%, 4%, 5%, 6%, and 7% of the total formulation by weight percentage. It is within the scope of the present disclosure for the amount of a physical nucleating agent in the formulation to fall within one of many different ranges. In a first set of ranges, the range of a physical nucleating agent is one of the following ranges: about 0% to 7%, 0.1% to 7%, 0.25% to 7%, 0.5% to 7%, 0.75% to 7%, 1% to 7%, 1.25% to 7%, about 1.5% to 7%, 1.75% to 7%, 2.0% to 7%, 2.25% to 7%, 2.5% to 7%, 3% to 7%, 4% to 7%, 5% to 7%, and 6% to 7% of the total formulation by weight percentage. In a second set of ranges, the range of a physical nucleating agent is one of the following ranges: about 0% to 6%, 0% to 5%, 0% to 4%, 0% to 3%, 0% to 2.5%, 0% to 2.25%, 0% to 2%, 0% to 1.75%, 0% to 1.5%, 0% to 1.25%, 0% to 1%, 0% to 0.75%, and 0% to 0.5% of the total formulation by weight percentage. In a third set of ranges, the range of a physical nucleating agent is one of the following ranges: about 0.1% to 6%, 0.1% to 5%, 0.1% to 4%, 0.1% to 3.5%, 0.1% to 3%, 0.1% to 2.5%, 0.1% to 2.25%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples. Each of these values and ranges is embodied in the Examples. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A core-layer formulation can include a nucleating agent. The amount of a nucleating agent may be one of several different values or fall within one of several different ranges. It is within the scope of the present disclosure to select an amount of a nucleating agent and be one of the following values: about 0.1%, 0.25%, 0.5%, 0.75%, 1%, 1.5%, 2%, 2.5%, 3%, 3.5%, 4%, 5%, 10%, and 15% of the total formulation by weight percentage. It is within the scope of the present disclosure for the amount of a nucleating agent in the formulation to fall within one of many different ranges. In a first set of ranges, the range of a nucleating agent is one of the following ranges: about 0.1% to 15%, 0.25% to 15%, 0.5% to 15%, 1% to 15%, 1.5% to 15%, 2% to 15%, 2.5% to 15%, 3% to 15%, 3.5% to 15%, 4% to 15%, 4.5% to 15%, and 5% to 15% of the total formulation by weight percentage. In a second set of ranges, the range of a nucleating agent is one of the following ranges: about 0.1% to 10%, 0.25% to 10%, 0.5% to 10%, 0.75% to 10%, 1% to 10%, 1.5% to 10%, 2% to 10%, 2.5% to 10%, 3% to 10%, 3.5% to 10%, 4% to 10%, 4.5% to 10%, and 5% to 10% of the total formulation by weight percentage. In a third set of ranges, the range of a nucleating agent is one of the following ranges: about 0.1% to 5%, 0.25% to 5%, 0.5% to 5%, 0.75% to 5%, 1% to 5%, 1.5% to 5%, 2% to 5%, 2.5% to 5%, 3% to 5%, 3.5% to 5%, 4% to 5%, and 4.5% to 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like. In an illustrative example, a physical blowing agent may be introduced at a rate of about 0.02 pounds per hour to about 0.15 pounds per hour. In still yet another illustrative example, the physical blowing agent may be introduced at a rate of about 0.05 pounds per hours to about 0.15 pounds per hour.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

A core-layer formulation can include a slip agent. The amount of a slip agent may be one of several different values or fall within one of several different ranges. It is within the scope of the present disclosure to select an amount of a slip agent and be one of the following values: about 0%, 0.1%, 0.25%, 0.5%, 0.75%, 1%, 1.25%, 1.5%, 1.75%, 2%, 2.25%, 2.5%, and 3% of the total formulation by weight percentage. It is within the scope of the present disclosure for the amount of a slip agent in the formulation to fall within one of many different ranges. In a first set of ranges, the range of a slip agent is one of the following ranges: about 0% to 3%, 0.1% to 3%, 0.25% to 3%, 0.5% to 3%, 1% to 3%, 1.25% to 3%, 1.5% to 3%, 1.75% to 3%, 2% to 3%, 2.25% to 3%, and 2.5% to 3% of the total formulation by weight percentage. In a second set of ranges, the range of a slip agent is one of the following ranges: about 0% to 2.5%, 0% to 2%, 0% to 1.75%, 0% to 1.5%, 0% to 1.25%, 0% to 1%, 0% to 0.75%, 0% to 0.5%, and 0.1% to 2.5% of the total formulation by weight percentage. In a third set of ranges, the range of a slip agent is one of the following ranges: about 0.1% to 2.5%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer.

In an embodiment, a colorant can be about 0% to about 4% (w/w), about 0.1% to about 4%, about 0.25% to about 4%, about 0.5% to about 4%, about 0.75% to about 4%, about 1.0% to about 4%, about 1.25% to about 4%, about 1.5% to about 4%, about 1.75% to about 4%, about 2.0% to about 4%, about 2.25% to about 4%, about 2.5% to about 4%, about 3% to about 4%, about 0% to about 3.0%, about 0% to about 2.5%, about 0% to about 2.25%, about 0% to about 2.0%, about 0% to about 1.75%, about 0% to about 1.5%, about 0% to about 1.25%, about 0% to about 1.0%, about 0% to about 0.75%, about 0% to about 0.5%, about 0.1% to about 3.5%, about 0.1% to about 3.0%, about 0.1% to about 2.5%, about 0.1% to about 2.25%, about 0.1% to about 2.0%, about 0.1% to about 1.75%, about 0.1% to about 1.5%, about 0.1% to about 1.25%, about 0.1% to about 1.0%, about 0.1% to about 0.75%, or about 0.1% to about 0.5%. In an embodiment, the formulation lacks a colorant.

A core-layer formulation can include a colorant. The amount of a colorant may be one of several different values or fall within one of several different ranges. It is within the scope of the present disclosure to select an amount of a colorant and be one of the following values: about 0%, 0.1%, 0.25%, 0.5%, 0.75%, 1%, 1.25%, 1.5%, 1.75%, 2%, 2.25%, 2.5%, 3%, and 4% of the total formulation by weight percentage. It is within the scope of the present disclosure for the amount of a slip agent in the formulation to fall within one of many different ranges. In a first set of ranges, the range of a colorant is one of the following ranges: about 0% to 4%, 0.1% to 4%, 0.25% to 4%, 0.5% to 4%, 1% to 4%, 1.25% to 4%, 1.5% to 4%, 1.75% to 4%, 2% to 4%, 2.25% to 4%, 2.5% to 4%, and 3% to 4% of the total formulation by weight percentage. In a second set of ranges, the range of a colorant is one of the following ranges: about 0% to 3%, 0% to 2.5%, about 0% to 2.25%, 0% to 2%, 0% to 1.75%, 0% to 1.5%, 0% to 1.25%, 0% to 1%, 0% to 0.75%, and 0% to 0.5% of the total formulation by weight percentage. In a third set of ranges, the range of a slip agent is one of the following ranges: about 0.1% to 3.5%, 0.1% to 3.0%, 0.1% to 2.5%, 0.1% to 2.25%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples.

According to an aspect of the present disclosure, there is provided a method of producing a multilayer vessel, the method comprising the steps of
- (a) extruding an inner-layer formulation, a core-layer formulation, and an outer-layer formulation to form an inner parison, an outer parison, and a core parison configured to have a core-parison density different than each of an inner-parison density of the inner parison and an outer-parison density of the outer parison,
- (b) aligning the inner parison, the core parison, and the outer parison to cause the core parison to be located between the inner parison and the outer parison to cause the core parison to surround the inner parison and to be surrounded by the outer parison to form a multilayer tube,
- (c) placing the multilayer tube in a mold cavity formed in a mold, and
- (d) forming a multilayer vessel having an interior region formed therein by expanding the multilayer tube within the mold so that the outer parison engages an inner surface of the mold, and wherein the core parison of the multilayer tube is transformed into a core layer of the vessel having a core-layer density that enables cell collapse and damage within the core layer of multilayer vessel to be minimized.

The inner, core and outer parisons forming the multi-layer parison are disposed one directly on top of the other, in the sense that the core parison is coupled to the inner parison on one side and the outer parison on the other side. It will also be understood that in step (b) the multi-later parison is extruded in the form of a multi-layer tube in which the core parison surrounds the inner parison and the outer parison surrounds the core parison.

In an embodiment, in step (b), the inner parison core parison, and outer parison from step (a) are aligned such that the core parison is located between the inner parison and the outer parison and the aligned parisons are then co-extruded to form the multilayer tube.

In an embodiment, the outer and inner parisons each comprise a high density polymeric material. In another embodiment, the high-density polymeric material is high density polyethylene or polypropylene.

In one example, the polypropylene used in either of the skin layers is a high stiffness polypropylene. In another example, the polypropylene used in either of the skin layers is a high impact polypropylene. In another example, the polypropylene used in either of the skin layers is DOW® D 207.03 developmental performance polypropylene resin or DOW® DC 7067.00 polypropylene impact copolymer. Reference is hereby made to U.S. patent application Ser. No. 14/468,789, filed Aug. 26, 2014 and titled POLYMERIC MATERIAL FOR CONTAINER for disclosure relating to polypropylene used in either of the skin layers in accordance with the present disclosure, which application is hereby incorporated herein by reference in its entirety.

In a particular embodiment, both of the outer and inner parisons are a formed from a polypropylene selected from DOW® D 207.03 developmental performance polypropylene resin and/or DOW® DC 7067.00 polypropylene impact copolymer.

In an embodiment, the polyethylene used in either of the inner and outer parisons is a high density ethylene hexane-1 copolymer. In an embodiment, the high density polyethylene is a HDPE hexene copolymer. In a particular embodiment, the high density polyethylene is FORMOLENE® HB5502F HDPE hexene copolymer (available from Formosa Plastics Corporation).

Alternatively, the polyethylene used in either of the inner and outer parisons may be Chevron Phillips MARLEX® HHM 5502 BN.

In certain embodiment, one or both of the inner and outer layers comprise a high-density polymeric material as hereinbefore defined and a colorant. For example, one or both of the inner and outer layers may comprise 95-99.9% (w/w) of a high-density polymeric material as hereinbefore defined and 0.1 to 5% (w/w) a colorant. In an embodiment, one or both of the inner and outer layers may comprise 97-99.9% (w/w) of a high-density polymeric material as hereinbefore defined and 0.1 to 3% (w/w) a colorant. In a further embodiment, one or both of the inner and outer layers may comprise 98-99.5% (w/w) of a high-density polymeric material as hereinbefore defined and 0.5 to 2% (w/w) a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In some examples, inner-layer formulation and outer-layer formulation may be the same. In other examples, inner-layer formulation and outer-layer formulation may be different.

The core formulation may be defined hereinbefore. In an embodiment, the core formulation comprises:
  85-99.9% (w/w) of a high density polyethylene (HDPE) as defined herein;
  0.1-15% (w/w) of a nucleating agent as defined herein;
  0-3% (w/w) of a slip agent as defined herein; and
  0-4% (w/w) of a colorant as defined herein.
In a further embodiment, the core formulation comprises:
  97-99.9% (w/w) of a high density polyethylene (HDPE) as defined herein;
  0.1-3% (w/w) of a nucleating agent as defined herein;
  0-3% (w/w) of a slip agent as defined herein; and
  0-3% (w/w) of a colorant as defined herein.
In a further embodiment, the core formulation comprises:
  98-99.9% (w/w) of a high density polyethylene (HDPE) as defined herein;
  0.1-2% (w/w) of a nucleating agent as defined herein;
  0-2% (w/w) of a slip agent as defined herein; and
  0-2% (w/w) of a colorant as defined herein.

In step (d) the expansion of the multilayer tube is achieved by blow molding the multi-layer tube using techniques known in the art.

According to another aspect of the present disclosure, there is provided a multi-layer vessel obtainable, obtained, or directly obtained by a process defined herein.

The following numbered clauses include embodiments that are contemplated and non-limiting:

Clause 1. A method of producing a multilayer vessel, the method comprising the steps of
  extruding an inner parison, an outer parison, and a core parison,
  aligning the inner parison, the core parison, and the outer parison to cause the core parison to be located between the inner parison and the outer parison to cause the core parison to surround the inner parison and to be surrounded by the outer parison to form a multilayer tube, placing the multilayer tube in a mold cavity formed in a mold, and expanding the multilayer tube to cause the outer parison to engage an inner surface of a mold and cause the multilayer tube to deform to create a multilayer vessel having an interior region, wherein the core parison comprises an insulative cellular non-aromatic polymeric material.

Clause 2. A method of producing a multilayer container comprising:

extruding a multilayer tube from an inner parison, an outer parison, and a core parison and molding the multilayer tube to form a multilayer container in a molding system comprising a mold, a vacuum system providing a vacuum pressure to a mold cavity of the mold during molding, a blowing system providing pressurized gas to tube space, and a trimming system removing excess material from the container following the molding.

Clause 3. The method of any other clause, further comprising the step of applying a vacuum in a range of about 5 millimeters Hg to about 25 millimeters Hg to the mold cavity during the expanding step whereby the outer parison engages with the inner surface of the mold.

Clause 4. The method of any other clause, wherein the vacuum is in a range of about 20 millimeters Hg to the mold cavity during the expanding step.

Clause 5. The method of any other clause, wherein the expanding step includes inserting a blow needle into the interior region of the multi-layer tube and pumping pressurized gas into interior region at a pressure in a range of about 10 pounds per square inch to about 130 pounds per square inch.

Clause 6. The method of any other clause, wherein the pressurized gas has a pressure in a range of about 30 pounds per square inch to about 50 pounds per square inch.

Clause 7. The method of any other clause, wherein the pressurized gas has a pressure of about 40 pounds per square inch.

Clause 8. The method of any other clause, wherein the expanding step includes inserting a blow needle into the interior region of the multi-layer tube and pumping pressurized gas into interior region at a temperature up to about 200 degrees Fahrenheit.

Clause 9. The method of any other clause, wherein the pressurized gas has a temperature in a range of about 35 degrees Fahrenheit to about 75 degrees Fahrenheit.

Clause 10. The method of any other clause, wherein the pressurized gas has a temperature of about 50 degrees Fahrenheit.

Clause 11. The method of any other clause, wherein the mold has a blow-up ratio in a range of about 100% to about 400%.

Clause 12. The method of any other clause, wherein the blow-up ratio in a range of about 100% to about 300%.

Clause 13. The method of any other clause, wherein the blow-up ratio in a range of about 150% to about 200%.

Clause 14. The method of any other clause, wherein the multi-layer container has an average collapse force of in a range of about 50 pounds-Force to about 400 pounds-Force.

Clause 15. The method of any other clause, wherein the average collapse force is in a range of about 100 pounds-Force to about 250 pounds-Force.

Clause 16. The method of any other clause, wherein the average collapse force is in a range of about 115 pounds-Force to about 170 pounds-Force.

Clause 17. The method of any other clause, wherein the multilayer vessel comprises a compressed core-layer.

Clause 18. The method of any other clause, wherein the insulative cellular non-aromatic polymeric material is a low density insulative cellular non-aromatic polymeric material Clause 19. The method of any other clause, wherein the inner parison is formed by extruding an inner-layer formulation of high-density polymeric material.

Clause 20. The method of any other clause, wherein the outer parison is formed by extruding an outer-layer formulation of high-density polymeric material.

Clause 21. The method of any other clause, wherein the core parison is formed by extruding a core-layer formulation of polymeric material.

Clause 22. The method of any other clause, wherein the inner-layer formulation and the outer-layer formulation are the same formulation.

Clause 23. The method of any other clause, wherein the inner-layer formulation and the outer-layer formulation are different formulations.

Clause 24. The method of any other clause, wherein the blowing system comprises a blow needle.

Clause 25. The method of any other clause, wherein the vacuum pressure in the mold cavity during molding is below atmospheric pressure.

Clause 26. The method of any other clause, wherein the vacuum pressure is about 5 millimeters Hg to about 25 millimeters Hg.

Clause 27. The method of any other clause, wherein the vacuum pressure is about 15 millimeters Hg to about 25 millimeters Hg.

Clause 28. The method of any other clause, wherein the vacuum pressure is about 20 millimeters Hg.

Clause 29. The method of any other clause, wherein the pressurized gas expands the multilayer tube in size.

Clause 30. The method of any other clause, wherein the pressurized gas is up to about 130 pounds per square inch (psi).

Clause 31. The method of any other clause, wherein the pressurized gas is about 40 psi.

Clause 32. The method of any other clause, wherein the pressurized gas is delivered at a temperature of about 0° F. to about 200° F.

Clause 33. The method of any other clause, wherein the pressurized gas is delivered at a temperature of about 30° F. to about 80° F.

Clause 34. The method of any other clause, wherein the pressurized gas is delivered at a temperature of about 40° F. to about 50° F.

Clause 35. The method of any other clause, wherein the pressurized gas is delivered at a temperature of about 40° F.

Clause 36. The method of any other clause, wherein the pressurized gas is delivered at a temperature of about 50° F.

Clause 37. The method of any other clause, wherein the pressurized gas is delivered at a temperature of about room temperature.

Clause 38. The method of any other clause, wherein the multilayer tube expands in size until the multilayer tube has substantially the same shape as the mold cavity.

Clause 39. The method of any other clause, wherein the pressurized gas and the vacuum pressure are provided simultaneously.

Clause 40. The method of any other clause, wherein the blow-up ratio is about 100% to about 400%.

Clause 41. The method of any other clause, wherein the blow-up ratio is about 150% to about 200%.

Clause 42. The method of any other clause, wherein the trimming system comprises one or more knives or blades.

Clause 43. The method of any other clause, wherein the multi-layer container has an average collapse force of about 115 pounds-Force to about 170 pounds-Force.

Clause 44. The method of any other clause, further comprising extruding an inner-layer formulation and outer layer formulation to form the inner parison and outer parison, wherein both the inner-layer formulation and the outer-layer formulation comprise high-density polymeric material.

Clause 45. The method of any other clause, wherein the inner-layer formulation and the outer-layer formulation are the same formulation.

Clause 46. The method of any other clause, wherein the inner-layer formulation and the outer-layer formulation are different formulations.

Clause 47. The method of any other clause, wherein the inner-layer formulation comprises one or more base resins.

Clause 48. The method of any other clause, wherein the one or more base resins is a high density polyethylene (HDPE).

Clause 49. The method of any other clause, wherein the HDPE is a HDPE hexene copolymer.

Clause 50. The method of any other clause, wherein the inner-layer formulation further comprises a colorant.

Clause 51. The method of any other clause, wherein the outer-layer formulation comprises one or more base resins.

Clause 52. The method of any other clause, wherein the one or more base resins is a high density polyethylene (HDPE).

Clause 53. The method of any other clause, wherein the HDPE is a HDPE hexene copolymer.

Clause 54. The method of any other clause, wherein the outer-layer formulation further comprises a colorant.

Clause 55. The method of any other clause, further comprising extruding a core-layer formulation to form the core parison, wherein the core-layer formulation comprises a high-density polymeric material.

Clause 56. The method of any other clause, wherein the core-layer formulation comprises one or more high density polyethylene base resins (HDPE).

Clause 57. The method of any other clause, wherein the HDPE is unimodal.

Clause 58. The method of any other clause, wherein the unimodal HDPE is a unimodal, high-melt strength HDPE.

Clause 59. The method of any other clause, wherein the unimodal, high-melt strength HDPE is electron beam modified.

Clause 60. The method of any other clause, wherein the electron beam modified unimodal, high-melt strength HDPE has long chain branching and a melt index of about 0.25 g/10 min.

Clause 61. The method of any other clause, wherein the one or more HDPE base resins is two HDPE base resins.

Clause 62. The method of any other clause, wherein the two HDPE base resins are 50% of a unimodal HDPE and 50% of an electron beam modified HDPE.

Clause 63. The method of any other clause, wherein the one or more HDPE resins comprises about 85% to 99.9% (w/w) HDPE base resin.

Clause 64. The method of any other clause, wherein the wherein the one or more HDPE resins comprises about 97% to about 99.9% HDPE base resin.

Clause 65. The method of any other clause, wherein the wherein the one or more HDPE resins comprises about 98% to about 99.9% HDPE base resin.

Clause 66. The method of any other clause, wherein the core-layer formulation further comprises a nucleating agent.

Clause 67. The method of any other clause, wherein the nucleating agent is about 0.1% to 15% (w/w) of the core-layer formulation.

Clause 68. The method of any other clause, wherein the nucleating agent is a chemical nucleating agent, a physical nucleating agent, or both a chemical nucleating agent and a physical nucleating agent.

Clause 69. The method of any other clause, wherein the physical nucleating agent is selected from the group consisting of talc, calcium carbonate, mica, and mixtures thereof.

Clause 70. The method of any other clause, wherein the physical nucleating agent is about 0% to 7% (w/w) of the core-layer formulation.

Clause 71. The method of any other clause, wherein the physical nucleating agent is about 0.1% to 0.5% (w/w) of the core-layer formulation.

Clause 72. The method of any other clause, wherein the physical nucleating agent is talc.

Clause 73. The method of any other clause, wherein the core-layer formulation lacks talc.

Clause 74. The method of any other clause, wherein the chemical nucleating agent is a blowing agent.

Clause 75. The method of any other clause, wherein the blowing agent is citric acid or a citric acid-based material.

Clause 76. The method of any other clause, wherein the chemical blowing agent is a citric acid and a crystal nucleating agent.

Clause 77. The method of any other clause, wherein the chemical blowing agent is selected from the group consisting of azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis (benzene sulfonyl hydrazide); diphenyl sulfone-3,3'-disulfonyl hydrazide; calcium azide; 4,4'-diphenyl disulfonyl azide; and p-toluene sulfonyl azide.

Clause 78. The method of any other clause, wherein the core-layer formulation further comprises a physical blowing agent.

Clause 79. The method of any other clause, wherein the physical blowing agent is selected from the group consisting of carbon dioxide, nitrogen, helium, argon, air, an alkane, and mixtures thereof.

Clause 80. The method of any other clause, wherein the alkane is pentane or butane.

Clause 81. The method of any other clause, wherein the core-layer formulation further comprises a slip agent.

Clause 82. The method of any other clause, wherein the slip agent is about 0% to 3% (w/w) of the core-layer formulation.

Clause 83. The method of any other clause, wherein the slip agent is an amide of fat or fatty acid, a low molecular weight amide, or fluoroelastomer.

Clause 84. The method of any other clause, wherein the fatty acid amide is a single unsaturated $C_{18}$ to $C_{22}$ amide.

Clause 85. The method of any other clause, wherein the fatty acid amide is erucamide or oleamide.

Clause 86. The method of any other clause, wherein the core-layer formulation further comprises a colorant.

Clause 87. The method of any other clause, wherein the colorant is titanium dioxide.

Clause 88. The method of any other clause, wherein the colorant is about 0% to 4% (w/w) of the core-layer formulation.

Clause 89. The method of any other clause, wherein the multilayer tube further comprises an additional layer selected from the group consisting of an oxygen barrier layer, an oxygen scavenging layer, a UV barrier layer, a tie layer, an additional structural layer, and combinations thereof.

Clause 90. The method of any other clause, wherein the oxygen barrier layer comprises ethylene vinyl alcohol.

Clause 91. The method of any other clause, wherein the multilayer tube has a density of about 0.35 g/cm³ or about 0.55 g/cm³.

Clause 92. The method of any other clause, wherein the multilayer tube has a density of about 0.4 g/cm³.

EXAMPLE 1

Formulations and Test Results

Inner-layer formulation 40 comprises about 100% FORMOSA PLASTICS® FORMOLENE® HB5502F HDPE hexene copolymer. Outer-layer formulation 44 comprises about 99% FORMOSA PLASTICS® FORMOLENE® HB5502F HDPE hexene copolymer and about 1% COLORTECH® 11933-19.

Core-layer formulation 48 comprises FORMOSA PLASTICS® FORMOLENE® HB5502F HDPE hexene copolymer which was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and N2 as a blowing agent. The blowing agent was used at levels between about 0.05 lbs/hr to about 0.15 lbs/hour. COLORTECH® 11933-19 was added as a colorant in some examples. The various formulations and resulting multi-layer tube densities are shown below in Table 9.

TABLE 9

Comparison of different insulative cellular non-aromatic polymeric material formulations to create various multi-layer parison and insulative container densities

| | Inner-Layer Formulation | Core-Layer Formulation | | | | | Outer-Layer Formulation | | Tube |
|---|---|---|---|---|---|---|---|---|---|
| Trial | Formosa 5502F | Formosa 5502F | Colortech | CF-40E | HT6000 | N2 [lbs/hr] | Formosa 5502F | Colortech | Density [g/cm³] |
| 1 | 100% | 97.95% | 1% | 0.75% | 0.3% | 0.1222 | 99% | 1% | * |
| 2 | 100% | 98% | 0% | 2% | 0% | 0.0529 | 99% | 1% | * |
| 3 | 100% | 99.25% | 0% | 0.75% | 0% | 0.0534 | 99% | 1% | * |
| 4 | 100% | 99% | 0% | 1.0% | 0% | 0.0511 | 99% | 1% | 0.4292 |
| 5 | 100% | 98.7% | 0% | 1.0% | 0.3% | 0.0514 | 99% | 1% | 0.4272 |
| 6 | 100% | 98.45% | 0% | 1.25% | 0.3% | 0.0521 | 99% | 1% | 0.4276 |
| 7 | 100% | 98.75% | 0% | 1.25% | 0% | 0.0529 | 99% | 1% | 0.4236 |
| 8 | 100% | 98.75% | 0% | 1.25% | 0% | 0.0522 | 99% | 1% | 0.4234 |
| 9 | 100% | 98.75% | 0% | 1.25% | 0% | 0.0538 | 99% | 1% | 0.4304 |
| 10 | 0% | 100% | 0% | 0% | 0% | 0.1468 | 0% | 0% | * |
| 11 | 100% | 100% | 0% | 0% | 0% | 0.1392 | 99% | 1% | * |
| 12 | 100% | 99.9% | 0% | 0% | 0.1% | 0.1393 | 99% | 1% | * |
| 13 | 100% | 99.5% | 0% | 0% | 0.5% | 0.0656 | 99% | 1% | * |
| 14 | 100% | 99.4% | 0% | 0.1% | 0.5% | 0.0702 | 99% | 1% | * |
| 15 | 100% | 99.3% | 0% | 0.2% | 0.5% | 0.0692 | 99% | 1% | * |
| 16 | 100% | 99.7% | 0% | 0.1% | 0.2% | 0.0673 | 99% | 1% | * |
| 17 | 100% | 99.7% | 0% | 0.1% | 0.2% | 0.0892 | 99% | 1% | * |
| 18 | 100% | 99.7% | 0% | 0.1% | 0.2% | 0.105 | 99% | 1% | * |
| 19 | 100% | 99.7% | 0% | 0.1% | 0.2% | 0.1188 | 99% | 1% | * |
| 20 | 100% | 99.7% | 0% | 0.1% | 0.2% | 0.0915 | 99% | 1% | * |
| 21 | 100% | 99.05% | 0% | 0.75% | 0.2% | 0.0906 | 99% | 1% | * |

* Data not available

EXAMPLE 2

Density Measurements

This Example demonstrates the test used to measure the density of filled and unfilled polymer parts.

Procedure

The density was determined by the apparatus shown, unassembled, in FIG. 17. Although not shown in FIG. 17, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm3, so most unfilled polymers require some other suspension fluid such as isopropyl alcohol, density=0.8808 g/cm3. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the suspension fluid density (0.8808 g/cc) and dividing by the sample buoyancy (0.3287 g), which equaled 1.0272 g/cc.

EXAMPLE 3

Formulations

Core-layer formulation 48 comprised FORMOSA PLASTICS® FORMOLENE® HB5502F HDPE hexene copolymer which was used as polyethylene base resin. In some examples, core-formulation 48 comprised Versalite (A) or Versalite (B). Reference is hereby made to U.S. patent application Ser. No. 14/462,073, filed Aug. 18, 2014 and titled POLYMERIC MATERIAL FOR AN INSULATED CONTAINER for disclosure relating to various formulations of VERSALITE in accordance with the present disclosure, which application is hereby incorporated herein by reference in its entirety. In further examples, LLDPE comprised DOW® DOWLEX™ 2045G LLDPE (available from The Dow Chemical Company), electron beam modified to have long-chain branching and a melt index of about 0.2 or 0.13 g/10 min. In still further examples, the polyethylene base resin was blended with HYDROCEROL® CF 40E as a chemical blowing agent and Heritage Plastics HT6000 LLDPE talc as another nucleating agent. In still yet further examples, $N_2$ was used as a blowing agent. The blowing agent was used at levels between about 0.02 lbs/hr to about 0.15 lbs/hour. The molding machine 52 was a rotary extrusion blow-molding machine available from Wilmington Machinery of Wilmington, N.C. The RPM speed of this machine was at levels between about 5 RPM to about 75 RPM. The various formulations are shown below in Table 10.

The blowing agent, $N_2$, was injected into the molten formulation to expand the molten formulation and reduce the density of the mixture of polymer and nucleating agent. The resulting expanded formulation was then extruded through a die head to establish a core-layer parison. The core-layer parison was molded to form a container according to the present disclosure.

TABLE 10

Comparison of different insulative cellular non-aromatic polymeric material formulations of Example 3.

| Trial [#] | Formosa 5502F | Ampacet 102823 [0.2 MI] | Ampacet 102823 [0.13 MI] | Versalite | CF-40E | HT6000 | $N_2$ [lbs/hr] | Processing [RPM] |
|---|---|---|---|---|---|---|---|---|
| 7.0.0 | 100% | 0% | 0% | 0% | 0% | 0% | 0 | 20 |
| 7.0.5 | 100% | 0% | 0% | 0% | 0% | 0% | 0.132 | 20 |
| 7.1.0 | 98.8% | 0% | 0% | 0% | 0.2% | 1.0% | 0.132 | 20 |
| 7.2.0 | 49.7% | 49.7% | 0% | 0% | 0.1% | 0.5% | 0.132 | 20 |
| 7.3.0 | 0% | 0% | 0% | 100% (B) | 0% | 0% | 0.132 | 12 |
| 7.3.1 | 0% | 0% | 0% | 100% (B) | 0% | 0% | 0.132 | 24 |
| 7.4.0 | 0% | 0% | 0% | 100% (A) | 0% | 0% | 0.132 | 12 |
| 7.4.1 | 0% | 0% | 0% | 100% (A) | 0% | 0% | 0.132 | 24 |
| 7.4.2 | 0% | 0% | 0% | 100% (A) | 0% | 0% | 0.132 | 36 |
| 7.4.3 | 0% | 99.4% | 0% | 0% | 0.1% | 0.5% | 0.132 | 18 |
| 7.4.4 | 0% | 99.4% | 0% | 0% | 0.1% | 0.5% | 0.132 | 36 |
| 7.5.0 | 0% | 99.4% | 0% | 0% | 0.1% | 0.5% | 0.132 | 20 |
| 7.5.1 | 0% | 99.4% | 0% | 0% | 0.1% | 0.5% | 0.132 | 75 |
| 7.6.0 | 0% | 74.55% | 0% | 24.85% | 0.1% | 0.5% | 0.132 | 20 |
| 7.7.0 | 0% | 0% | 99.4% | 0% | 0.1% | 0.5% | 0.07 | 20 |
| 7.7.1 | 0% | 0% | 99.4% | 0% | 0.1% | 0.5% | 0.07 | 20 |
| Pre-7.8.0 Purge | 100% | 0% | 0% | 0% | 0% | | 0.07 | 20 |
| 7.8.0 | 99.4% | 0% | 0% | 0% | 0.1% | 0.5% | 0.07 | 11 |
| 7.8.1 | 99.4% | 0% | 0% | 0% | 0.1% | 0.5% | 0.035 | 11 |
| 7.9.0A | 99.4% | 0% | 0% | 0% | 0.1% | 0.5% | 0.035 | 11 |
| 7.9.0B | 99.4% | 0% | 0% | 0% | 0.1% | 0.5% | 0.035 | 19 |
| 7.9.1 | 99.4% | 0% | 0% | 0% | 0.1% | 0.5% | 0.07 | 18 |
| 7.9.2A | 99.4% | 0% | 0% | 0% | 0.1% | 0.5% | 0.05 | 18 |
| 7.9.2B | 99.4% | 0% | 0% | 0% | 0.1% | 0.5% | 0.05 | 11 |
| 7.10A | 0% | 0% | 99.4% | 0% | 0.1% | 0.5% | 0.02 | 9 |
| 7.10B | 0% | 0% | 99.4% | 0% | 0.1% | 0.5% | 0.02 | 25 |
| 7.10C | 0% | 0% | 99.4% | 0% | 0.1% | 0.5% | 0.05 | 25 |
| 7.11A | 84.5% | 0% | 14.9% | 0% | 0.1% | 0.5% | 0.03 | 18 |
| 7.9 | 99% | 0% | 0% | 0% | 1% | 0% | 0.05 | * |
| 7.10 | 98.7% | 0% | 0% | 0% | 1% | 0.3% | 0.05 | * |

TABLE 10-continued

Comparison of different insulative cellular non-aromatic polymeric material formulations of Example 3.

| Trial [#] | Formosa 5502F | Ampacet 102823 [0.2 MI] | Ampacet 102823 [0.13 MI] | Versalite | CF-40E | HT6000 | N₂ [lbs/hr] | Processing [RPM] |
|---|---|---|---|---|---|---|---|---|
| 7.11 | 98.45% | 0% | 0% | 0% | 1.25% | 0.3% | 0.05 | * |
| 7.12 | 98.75% | 0% | 0% | 0% | 1.25% | 0% | 0.05 | * |
| 7.20 | 99.4% | 0% | 0% | 0% | 0.10% | 0.5% | 0.07 | * |
| 7.21 | 99.3% | 0% | 0% | 0% | 0.20% | 0.5% | 0.07 | * |

* Data not available

EXAMPLE 4

Parison Densities, Bottle Densities, Weight, Top Load Performance, and Thickness for Formulations of Example 3

Containers formed according to Table 10 were subjected to a series of measurements and performance tests including core-layer parison density (ρ) measurements, container density (ρ) measurements, weight measurements, thickness measurements, and top load force performance measurements. The results are shown below in Table 11.

Density was determined by the apparatus and methods described in Example 2. Top load performance was measured by methods described in Example 7.

TABLE 11

Parison densities, container densities, weights, top load performance, and bottle side wall thicknesses of different insulative cellular non-aromatic polymeric material formulations of Example 3.

| Trial [#] | Parison Density [g/cc] | Container Density [g/cc] | Weight [g] | Top Load [lbs-F] | Thickness [mils] |
|---|---|---|---|---|---|
| 7.0.0 | 0.95 | 0.95 | 60.3 | 133 | 42.3 |
| 7.0.5 | 0.90 | * | * | * | * |
| 7.1.0 | 0.70 | * | * | * | * |
| 7.2.0 | 0.60 | * | * | * | * |
| 7.3.0 | 0.70 | * | * | * | * |
| 7.3.1 | 0.58 | * | * | * | * |
| 7.4.0 | 0.56 | * | * | * | * |
| 7.4.1 | 0.57 | * | * | * | * |
| 7.4.2 | 0.57 | * | * | * | * |
| 7.4.3 | 0.47 | * | * | * | * |
| 7.4.4 | 0.42 | * | * | * | * |
| 7.5.0 | 0.43 | * | * | * | * |
| 7.5.1 | 0.51 | * | * | * | * |
| 7.6.0 | 0.55 | 0.58 | * | * | * |
| 7.7.0 | 0.40 | * | * | * | * |
| 7.7.1 | 0.41 | 0.64 | * | * | * |
| Pre-7.8.0 Purge | * | 0.62 | * | * | * |
| 7.8.0 | 0.42 | * | * | * | * |
| 7.8.1 | 0.42 | * | * | * | * |
| 7.9.0A | 0.41 | 0.62 | 30.7 | 31 | 38.1 |
| 7.9.0B | 0.51 | 0.73 | 49.0 | 87 | 43.1 |
| 7.9.1 | * | * | * | * | * |
| 7.9.2A | 0.43 | 0.68 | 41.9 | 56 | 40.4 |
| 7.9.2B | * | * | * | * | * |
| 7.10A | 0.48 | 0.51 | * | * | * |
| 7.10B | 0.61 | 0.81 | * | * | * |
| 7.10C | 0.66 | * | * | * | * |
| 7.11A | 0.52 | 0.72 | * | * | * |
| 7.9 | 0.43 | 0.74 | 56 | * | * |
| 7.10 | 0.43 | 0.73 | 56 | * | * |
| 7.11 | 0.43 | 0.73 | 56 | * | * |
| 7.12 | 0.42 | 0.73 | 56 | * | * |
| 7.20 | * | 0.683 | 56 | * | * |
| 7.21 | * | 0.701 | 56 | * | * |

* Data not available

EXAMPLE 5

Molding Parameters Used to Form Containers

Core layer 48 comprised FORMOSA PLASTICS® FORMOLENE® HB5502F HDPE hexene copolymer as a polyethylene base resin. The polyethylene base resin was blended with HYDROCEROL® CF 40E as a chemical blowing agent and nucleating agent, Heritage Plastics HT6000 LLDPE Based Talc Concentrate as an additional nucleating agent. N2 was used as a blowing agent. The percentages were about:

99.4% FORMOLENE® HB5502F HDPE hexene copolymer 0.1% HYDROCEROL® CF 40E 0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.04 lbs/hr

The blowing agent, N₂ was injected into the molten formulation to expand the molten formulation and reduce the density of the mixture of polymer and nucleating agent. The resulting expanded formulation was then extruded through a die head to establish a parison, also called tube.

A mold was closed around the tube and a blow needle was inserted into a space formed in the tube. During inserting the needle, the mold moved away from the die head. In some examples, vacuum was applied to the mold and in others no vacuum was applied to the mold. Vacuum caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. In the next step, the mold was opened to reveal a container.

Parameters that were varied were cycle time, gas pressure, and vacuum. Cycle time is defined as an amount of time between closing the mold around the tube and opening the mold to reveal a container. In some examples, cycle time was varied between 14 and 18 seconds. In further examples, gas pressure varied between about 40 psi and about 60 psi. In still further examples, pressurized gas was about room temperature.

TABLE 12

Molding parameters used to form containers of Example 5.

| Run [#] | Cycle [s] | Air [psi] | Vacuum |
|---|---|---|---|
| 8.1.1 | 14 | 40 | Off |
| 8.1.2 | 14 | 40 | On |

TABLE 12-continued

Molding parameters used to form containers of Example 5.

| Run [#] | Cycle [s] | Air [psi] | Vacuum |
|---------|-----------|-----------|--------|
| 8.1.3   | 14        | 60        | Off    |
| 8.1.4   | 14        | 60        | On     |
| 8.1.5   | 15        | 40        | Off    |
| 8.1.6   | 15        | 40        | On     |
| 8.1.7   | 15        | 60        | Off    |
| 8.1.8   | 15        | 60        | On     |
| 8.1.9   | 16        | 40        | Off    |
| 8.1.10  | 16        | 40        | On     |
| 8.1.11  | 16        | 60        | Off    |
| 8.1.12  | 16        | 60        | On     |
| 8.1.13  | 17        | 40        | Off    |
| 8.1.1   | 17        | 40        | On     |
| 8.1.2   | 17        | 60        | Off    |
| 8.1.3   | 17        | 60        | On     |
| 8.1.4   | 18        | 40        | Off    |
| 8.1.5   | 18        | 40        | On     |
| 8.1.6   | 18        | 60        | Off    |
| 8.1.7   | 18        | 60        | On     |

EXAMPLE 6

Drop Test Measurements
General Procedure

Drop testing determines a likelihood of container survival due to a drop or impact to the container. Containers were subjected to a drop testing procedure based on ASTM D2463 (Standard Test Method for Drop Impact Resistance of Blow-Molded Thermoplastic Containers), which is incorporated by reference herein in its entirety.

The drop test was performed according to the following procedure. A bucket was filled with tap water. The water in the bucket was allowed to condition for at least 24 hours at about room temperature and about 75% relative humidity. The container was filled with water from the bucket and closed off with, for example, a lid. The filled, capped containers were then subjected to the following procedure: (a) the filled, capped container was located at about five feet above a hard surface such as concrete or tile; (b) the filled, capped container was then oriented such that a bottom of the filled, capped container was arranged to lie in a substantially parallel relation to the hard surface; (c) each of ten capped, filled containers were dropped; (d) upon impact, each filled, capped container was examined for any break or shattering of the wall that causes water to leak out of the bottle; and (d) the total number of bottles showing any sign of leakage after the drop test were counted as failures.

EXAMPLE 7

Top Load Measurements
General Procedure

Top load testing determines how much force a container can withstand before the container fails or necks in to form an hourglass shape. Various containers 10 were subjected to top load testing. An Instron tester, such as and generally consistent with an Instron Series 5500 Load Frame, may be used to determine top load performance as suggested in FIG. 15.

The top load test was generally performed according to the following procedure. A container was placed on a flat surface such that the floor of the container was arranged to lie in a substantially parallel relation to the flat surface. A crosshead of the Instrom tester applied a compressive force to the top of the neck of the container. A load transducer, mounted in series with the container, measured the applied load. Containers 10 were tested until they failed or necked in to form an hourglass shape. Once failure or necking was observed, the value shown on Instron tester was recorded.

EXAMPLE 8

Parison Densities, Bottle Densities, Weight, Top Load Performance, Thickness, and Drop Test Results for Formulations of Example 5

Containers formed according to Table 12 were subjected to a series of measurements and performance tests including core-layer parison density ($\rho$) measurements, container density ($\rho$) measurements, weight measurements, thickness measurements, top load force performance measurements, and drop testing. The results are shown below in Table 13.

Density was determined by the apparatus and methods described in Example 2. Drop tests were conducted by methods described in Example 6. Top load performance was measured by methods described in Example 7.

TABLE 13

Parison densities, bottle densities, weight, top load performance, bottle side wall thicknesses, and drop test results of different insulative cellular non-aromatic polymeric material formulations of Example 5.

| Run [#] | Parison Density [g/cc] | Container Density [g/cc] | Weight [g] | Thickness [mils] | Top Load [lbs-F] | Drop Test [Pass] |
|---------|------------------------|--------------------------|------------|------------------|------------------|------------------|
| 8.1.1   | 0.546                  | 0.748                    | 52.8       | 43.8             | 109.0            | 40%              |
| 8.1.2   | 0.570                  | 0.795                    | 53.8       | 44.6             | 107.5            | 80%              |
| 8.1.3   | 0.542                  | 0.706                    | 51.2       | 44.0             | 111.4            | 20%              |
| 8.1.4   | 0.538                  | 0.724                    | 51.8       | 46.6             | 105.3            | 20%              |
| 8.1.5   | 0.553                  | 0.792                    | 52.0       | 42.8             | 107.0            | 60%              |
| 8.1.6   | 0.559                  | 0.789                    | 52.4       | 42.9             | 107.5            | 40%              |
| 8.1.7   | 0.542                  | 0.844                    | 53.5       | 40.0             | 108.8            | 80%              |
| 8.1.8   | 0.550                  | 0.798                    | 52.6       | 39.1             | 106.8            | 100%             |
| 8.1.9   | 0.536                  | 0.649                    | 48.8       | 45.1             | 102.8            | 0%               |
| 8.1.10  | 0.549                  | 0.788                    | 51.4       | 42.3             | 102.7            | 60%              |
| 8.1.11  | 0.540                  | 0.825                    | 52.1       | 38.7             | 107.1            | 100%             |
| 8.1.12  | 0.555                  | 0.840                    | 51.5       | 39.2             | 103.1            | 80%              |
| 8.1.13  | 0.548                  | 0.791                    | 49.8       | 40.7             | 97.1             | 100%             |
| 8.1.14  | 0.544                  | 0.789                    | 50.0       | 40.4             | 95.0             | 100%             |
| 8.1.15  | 0.543                  | 0.716                    | 47.3       | 40.0             | 91.4             | 0%               |
| 8.1.16  | 0.548                  | 0.707                    | 47.5       | 40.1             | 89.4             | 20%              |
| 8.1.17  | 0.546                  | 0.806                    | 49.7       | 38.4             | 93.1             | 60%              |
| 8.1.18  | 0.540                  | 0.792                    | 50.1       | 40.2             | 94.5             | 80%              |
| 8.1.19  | 0.533                  | 0.833                    | 49.0       | 35.3             | 94.9             | 100%             |
| 8.1.20  | 0.547                  | 0.829                    | 48.8       | 36.1             | 92.6             | 80%              |

EXAMPLE 9

Formulations Comprising Electron Beam Modified HDPE

Core-layer formulation 48 comprised FORMOSA PLASTICS® FORMOLENE® HB5502F HDPE hexene copolymer as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin. The polyethylene base resin was blended with HYDROCEROL® CF 40E as a chemical blowing agent and nucleating agent. $N_2$ was used as a blowing agent. The blowing agent was used at levels between about 0.03 lbs/hr to about 0.11 lbs/hour.

The blowing agent, $N_2$, was injected into the molten formulation to expand the molten formulation and reduce the density of the mixture of polymer and nucleating agent.

The resulting expanded formulation was then extruded through a die head to establish a core-layer parison. The core-layer parison, also called tube, was molded to form a container according to the present disclosure.

TABLE 14

Comparison of different insulative cellular non-aromatic polymeric material formulations of Example 9.

| Run [#] | Formosa | E-Beam HDPE | Chemical Blowing Agent | Nitrogen [lbs/hr] |
|---|---|---|---|---|
| 8.2.1 | 25% | 75% | 0.1% | 0.035 |
| 8.2.2 | 25% | 75% | 0.5% | 0.07 |
| 8.2.3 | 25% | 75% | 1.0% | 0.105 |
| 8.2.4 | 50% | 50% | 0.1% | 0.07 |
| 8.2.5 | 50% | 50% | 0.5% | 0.105 |
| 8.2.6 | 50% | 50% | 1.0% | 0.035 |
| 8.2.7 | 75% | 25% | 0.1% | 0.105 |
| 8.2.8 | 75% | 25% | 0.5% | 0.035 |
| 8.2.9 | 75% | 25% | 1.0% | 0.07 |

EXAMPLE 10

Parison Densities, Bottle Densities, Weight, Top Load Performance, and Thickness for Formulations of Example 9

Containers formed according to Table 12 were subjected to a series of measurements and performance tests including core-layer parison density (ρ) measurements, container density (ρ) measurements, weight measurements, thickness measurements, and top load force performance measurements. The results are shown below in Table 13.

Density was determined by the apparatus and methods described in Example 2. Drop tests were conducted by methods described in Example 6. Top load performance was measured by methods described in Example 7.

TABLE 15

Parison densities, bottle densities, weight, top load performance, and bottle side wall thicknesses of different insulative cellular non-aromatic polymeric material formulations of Example 9.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 8.2.1 | 0.560 | 0.821 | 43.1 | 33.8 | 78.0 | 0.0 |
| 8.2.2 | 0.401 | 0.681 | * | * | * | * |
| 8.2.3 | 0.693 | 0.676 | * | * | * | * |
| 8.2.4 | 0.407 | 0.658 | 35.7 | 28.7 | 42.8 | 0.0 |
| 8.2.5 | 0.565 | 0.650 | * | * | * | * |
| 8.2.6 | 0.494 | 0.723 | 41.3 | 34.1 | 70.2 | 0.0 |
| 8.2.7 | 0.360 | 0.387 | * | * | * | * |
| 8.2.8 | 0.496 | 0.743 | 41.6 | 33.2 | 71.2 | 0.0 |
| 8.2.9 | 0.422 | 0.378 | * | * | * | * |

* Data not available

EXAMPLE 11

Formulations Comprising Electron Beam Modified LLDPE

Core-layer formulation 48 comprises FORMOSA PLASTICS® FORMOLENE® HB5502F HDPE hexene copolymer as a first material of a polyethylene base resin. DOW® DOWLEX™ 2045G LLDPE (available from The Dow Chemical Company), electron beam modified to have long-chain branching and a melt index of about 0.15 g/10 min, is used as a second material of a second polyethylene base resin. The polyethylene base resin is blended with HYDROCEROL® CF 40E as a chemical blowing agent and nucleating agent and Heritage Plastics HT6000 LLDPE Based Talc Concentrate as an additional nucleating agent. $N_2$ is used as a blowing agent.

The blowing agent, $N_2$, is injected into the molten formulation to expand the molten formulation and reduce the density of the mixture of polymer and nucleating agent. The resulting expanded formulation is then extruded through a die head to establish a core-layer parison. The tube is molded to form a container according to the present disclosure.

TABLE 16

Comparison of different insulative cellular non-aromatic polymeric material formulations of Example 11.

| Run [#] | Formosa | E-Beam LLDPE | Chemical Blowing Agent | N2 | HT6000 |
|---|---|---|---|---|---|
| 8.3.1 | 55% | 45% | 0.1% | 0.035 | 0.0025 |
| 8.3.2 | 55% | 45% | 0.5% | 0.07 | 0.005 |
| 8.3.3 | 55% | 45% | 1.0% | 0.105 | 0.01 |
| 8.3.4 | 70% | 30% | 0.1% | 0.07 | 0.01 |
| 8.3.5 | 70% | 30% | 0.5% | 0.105 | 0.0025 |
| 8.3.6 | 70% | 30% | 1.0% | 0.035 | 0.005 |
| 8.3.7 | 85% | 15% | 0.1% | 0.105 | 0.005 |
| 8.3.8 | 85% | 15% | 0.5% | 0.035 | 0.01 |
| 8.3.9 | 85% | 15% | 1.0% | 0.07 | 0.0025 |

EXAMPLE 12

Formulations Using Virgin and Regrind HDPE

Core-layer formulation 48 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and regrind materials. The polyethylene base resin was blended with HYDROCEROL® CF 40E as a chemical blowing agent and nucleating agent and Heritage Plastics HT6000 LLDPE Based Talc Concentrate as an additional nucleating agent. N2 was used as a blowing agent. The percentages were about:

99.4% FORMOLENE® HB5502F HDPE hexene copolymer 0.1% HYDROCEROL® CF 40E 0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.04 lbs/hr

The blowing agent, $N_2$ was injected into the molten formulation to expand the molten formulation and reduce the density of the mixture of polymer and nucleating agent. The resulting expanded formulation was then extruded through a die head to establish a parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is defined as an amount of time between closing the mold around the tube and opening the mold to reveal a container. The cycle time in this example was between 14 and 16 second. In one example, cycle time was 15 seconds.

TABLE 17

Virgin/regrind percentages and molding parameters used to form containers of Example 12.

| Run [#] | Virgin HDPE | Regrind HDPE | Cycle Time |
|---|---|---|---|
| 9.1. Control | 100% | 0% | 15 |
| 9.1.1 | 80% | 20% | 14 |
| 9.1.2 | 80% | 20% | 15 |
| 9.1.3 | 80% | 20% | 16 |
| 9.1.4 | 60% | 40% | 14 |
| 9.1.5 | 60% | 40% | 15 |
| 9.1.6 | 60% | 40% | 16 |
| 9.1.7 | 40% | 60% | 14 |
| 9.1.8 | 40% | 60% | 15 |
| 9.1.9 | 40% | 60% | 16 |
| 9.1.10 | 20% | 80% | 14 |
| 9.1.11 | 20% | 80% | 15 |
| 9.1.12 | 20% | 80% | 16 |

EXAMPLE 13

Parison Densities, Bottle Densities, Weight, Top Load Performance, and Thickness for Formulations of Example 12

Containers formed according to Table 17 were subjected to a series of measurements and performance tests including core-layer parison density ($\rho$) measurements, container density ($\rho$) measurements, weight measurements, thickness measurements, top load force performance measurements, and drop testing. The results are shown below in Table 18.

Density was determined by the apparatus and methods described in Example 2. Drop tests were conducted by methods described in Example 6. Top load performance was measured by methods described in Example 7.

TABLE 18

Parison densities, bottle densities, weights, top load performance, and bottle side wall thicknesses of different insulative cellular non-aromatic polymeric material formulations of Example 12.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 9.1.Control | 0.617 | 0.757 | 51.6 | 43.8 | 95.3 | 20% |
| 9.1.1 | 0.524 | 0.769 | 53.6 | 42.7 | 98.0 | 0% |
| 9.1.2 | 0.493 | 0.728 | 51.5 | 43.2 | 96.2 | 40% |
| 9.1.3 | 0.499 | 0.747 | 50.2 | 43.0 | 91.4 | 40% |
| 9.1.4 | 0.519 | 0.747 | 52.4 | 44.3 | 93.9 | 20% |
| 9.1.5 | 0.531 | 0.751 | 51.0 | 43.1 | 92.8 | 0% |
| 9.1.6 | 0.523 | 0.742 | 49.6 | 41.1 | 88.9 | 0% |
| 9.1.7 | 0.493 | 0.718 | 52.0 | 44.0 | 90.9 | 20% |
| 9.1.8 | 0.435 | 0.697 | 49.8 | 43.3 | 81.6 | 0% |
| 9.1.9 | 0.444 | 0.682 | 47.3 | 42.0 | 76.1 | 20% |
| 9.1.10 | 0.442 | 0.690 | 50.1 | 44.4 | 83.9 | 0% |
| 9.1.11 | 0.483 | 0.726 | 49.3 | 42.4 | 85.5 | 0% |
| 9.1.12 | 0.493 | 0.728 | 47.7 | 39.8 | 80.7 | 0% |

EXAMPLE 14

Formulations Using Virgin and Regrind HDPE

Core-layer formulation 48 comprised FORMOSA PLASTICS® FORMOLENE® HB5502F HDPE hexene copolymer as a first material of a polyethylene base resin. DOW® DOWLEX™ 2045G LLDPE (available from The Dow Chemical Company), electron beam modified to have long-chain branching and a melt index of about 0.15 g/10 min, was used as a second material of a second polyethylene base resin. The polyethylene base resin was blended with HYDROCEROL® CF 40E as a Chemical Blowing Agent (CBA) and nucleating agent and Heritage Plastics HT6000 LLDPE Based Talc Concentrate as an additional nucleating agent. $N_2$ was used as a blowing agent.

The blowing agent, $N_2$ was injected into the molten formulation at a rate between about 0.03 and 0.11 lbs/hr to expand the molten formulation and reduce the density of the mixture of polymer and nucleating agent. The resulting expanded formulation was then extruded through a die head to establish a core-layer parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is defined as an amount of time between closing the mold around the tube and opening the mold to reveal a container. The cycle time in this example was between 14 and 16 second. In one example, cycle time was 15 seconds.

TABLE 19

Comparison of different insulative cellular non-aromatic polymeric material formulations of Example 14.

| Run [#] | Formosa | E-Beam LLDPE | CBA | Nitrogen |
|---|---|---|---|---|
| 9.2.1 | 25% | 75% | 0.1% | 0.035 |
| 9.2.2 | 25% | 75% | 0.5% | 0.07 |
| 9.2.3 | 25% | 75% | 1.0% | 0.105 |
| 9.2.4 | 50% | 50% | 0.1% | 0.07 |
| 9.2.5 | 50% | 50% | 0.5% | 0.105 |
| 9.2.6 | 50% | 50% | 1.0% | 0.035 |
| 9.2.7 | 75% | 25% | 0.1% | 0.105 |
| 9.2.8 | 75% | 25% | 0.5% | 0.035 |
| 9.2.9 | 75% | 25% | 1.0% | 0.07 |

EXAMPLE 15

Parison Densities, Bottle Densities, Weight, Top Load Performance, and Thickness for Formulations of Example 14

Containers formed according to Table 19 were subjected to a series of measurements and performance tests including core-layer parison density ($\rho$) measurements, container density ($\rho$) measurements, weight measurements, thickness measurements, top load force performance measurements, and drop testing. The results are shown below in Table 20.

Density was determined by the apparatus and methods described in Example 2. Drop tests were conducted by methods described in Example 6. Top load performance was measured by methods described in Example 7.

TABLE 20

Parison densities, bottle Densities, weight, top load performance, and bottle side wall thicknesses of different insulative cellular non-aromatic polymeric material formulations of Example 14.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 9.2.1 | 0.688 | 0.760 | 42.6 | 36.6 | 28.3 | 0% |
| 9.2.2 | 0.529 | 0.401 | * | * | * | * |
| 9.2.3 | 0.474 | 0.587 | * | * | * | * |
| 9.2.4 | 0.432 | 0.661 | 40.7 | 38.0 | 35.8 | 0% |
| 9.2.5 | 0.478 | 0.647 | * | * | * | * |
| 9.2.6 | 0.527 | 0.768 | * | * | * | * |
| 9.2.7 | 0.371 | 0.503 | * | * | * | * |
| 9.2.8 | 0.555 | 0.802 | 47.1 | 41.5 | 74.0 | 40% |
| 9.2.9 | 0.432 | 0.419 | * | * | * | * |

* Data not available

EXAMPLE 16

Formulations Using Virgin and Second Pass Regrind HDPE

Core-layer formulation 48 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. Second pass regrind material may be, for example, material prepared previously in Table 17 which included first pass regrind. The polyethylene base resin was blended with HYDROCEROL® CF 40E as a chemical blowing agent and nucleating agent and Heritage Plastics HT6000 LLDPE Based Talc Concentrate as an additional nucleating agent. N2 was used as a blowing agent. The percentages were about:

99.4% FORMOLENE® HB5502F HDPE hexene copolymer
0.1% HYDROCEROL® CF 40E
0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.04 lbs/hr

The blowing agent, $N_2$ was injected into the molten formulation to expand the molten formulation and reduce the density of the mixture of polymer and nucleating agent. The resulting expanded formulation was then extruded through a die head to establish a parison.

A mold was closed around the tube and a blow needle was inserted into a space formed in the tube. During inserting the needle, the mold moved away from the die head. Vacuum was applied to the mold and caused the pressure to decrease to $P_{VAC}$, which is between about 0 inches Hg and about 29 inches Hg. Pressurized gas, in some examples air, was pumped into a space formed in the tube to cause the tube to expand and take on the shape of the mold. The pressurized gas in this example was about 40 psi and about room temperature. In the next step, the mold was opened to reveal a container. Cycle time is defined as an amount of time between closing the mold around the tube and opening the mold to reveal a container. The cycle time in this example was between 14 and 16 second. In one example, cycle time was 15 seconds.

TABLE 21

Virgin/second pass regrind percentages and molding parameters used to form containers of Example 16. Table 17 formulations were run through Table 21.

| Run [#] | Virgin | Second Pass Regrind | Cycle Time |
|---|---|---|---|
| 9.3.1 | 80% | 20% | 14 |
| 9.3.2 | 80% | 20% | 15 |
| 9.3.3 | 80% | 20% | 16 |
| 9.3.4 | 60% | 40% | 14 |
| 9.3.5 | 60% | 40% | 15 |
| 9.3.6 | 60% | 40% | 16 |
| 9.3.7 | 40% | 60% | 14 |
| 9.3.8 | 40% | 60% | 15 |
| 9.3.9 | 40% | 60% | 16 |
| 9.3.10 | 20% | 80% | 14 |
| 9.3.11 | 20% | 80% | 15 |
| 9.3.12 | 20% | 80% | 16 |
| 9.3.13 | 0% | 100% | 14 |
| 9.3.14 | 0% | 100% | 15 |
| 9.3.15 | 0% | 100% | 16 |

EXAMPLE 17

Parison Densities, Bottle Densities, Weight, Top Load Performance, and Thickness for Formulations of Example 16

Containers formed according to Table 21 were subjected to a series of measurements and performance tests including core-layer parison density (ρ) measurements, container density (ρ) measurements, weight measurements, thickness measurements, top load force measurements, and drop testing. The results are shown below in Table 22.

Density was determined by the apparatus and methods described in Example 2. Drop tests were conducted by methods described in Example 6. Top load performance was measured by methods described in Example 7.

TABLE 22

Parison densities, bottle densities, weight, top load performance, and bottle side wall thicknesses of different insulative cellular non-aromatic polymeric material formulations of Example 16.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 9.3.1 | 0.536 | 0.773 | 52.66072 | 44.1 | 105.4 | 20% |
| 9.3.2 | 0.502 | 0.764 | 52.33318 | 43.9 | 111.5 | 40% |
| 9.3.3 | 0.496 | 0.778 | 50.3535 | 41.0 | 104.9 | 0% |
| 9.3.4 | * | * | * | * | * | * |
| 9.3.5 | * | * | * | * | * | * |
| 9.3.6 | * | * | * | * | * | * |
| 9.3.7 | * | * | * | * | * | * |
| 9.3.8 | * | * | * | * | * | * |
| 9.3.9 | * | * | * | * | * | * |
| 9.3.10 | * | * | * | * | * | * |
| 9.3.11 | * | * | * | * | * | * |
| 9.3.12 | * | * | * | * | * | * |
| 9.3.13 | * | * | * | * | * | * |

TABLE 22-continued

Parison densities, bottle densities, weight, top load performance, and bottle side wall thicknesses of different insulative cellular non-aromatic polymeric material formulations of Example 16.

| Run [#] | Parison Density [g/cc] | Container Density [g/cc] | Weight [g] | Thickness [mils] | Top Load [lbs-F] | Drop Test [Pass] |
|---|---|---|---|---|---|---|
| 9.3.14 | * | * | * | * | * | * |
| 9.3.15 | * | * | * | * | * | * |

* Data not available

EXAMPLE 18

Throughput Study

Core-layer formulation 48 comprised FORMOSA PLASTICS® FORMOLENE® HB5502F HDPE hexene copolymer as a first material of a polyethylene base resin. In some examples, the FORMOSA PLASTICS® FORMOLENE® HB5502F HDPE hexene copolymer comprises various amounts of virgin and second pass regrind material. The polyethylene base resin was blended with HYDROCEROL® CF 40E as a chemical blowing agent and nucleating agent and Heritage Plastics HT6000 LLDPE Based Talc Concentrate as an additional nucleating agent. N2 was used as a blowing agent. The percentages were about:

99.4% FORMOLENE® HB5502F HDPE hexene copolymer
0.1% HYDROCEROL® CF 40E
0.5% Heritage Plastics HT6000 LLDPE Based Talc Concentrate The HDPE and nucleating agents were added to an extruder hopper and blended to provide a formulation. The formulation was then heated in the extruder to form a molten formulation. The blowing agent was then added to the molten formulation at a rate of about:

0.04 lbs/hr

Containers were prepared according to the present disclosure. The molding machine 52 was a rotary extrusion blow-molding machine available from Wilmington Machinery of Wilmington, N.C. The RPM speed of this machine was at levels between about 5 RPM to about 75 RPM.

Containers were subjected to a series of measurements and performance tests including core-layer parison density (ρ) measurements, container density (ρ) measurements, weight measurements, thickness measurements, top load force measurements, and drop testing. The results are shown below in Table 23.

Density was determined by the apparatus and methods described in Example 2. Drop tests were conducted by methods described in Example 6. Top load performance was measured by methods described in Example 7.

TABLE 23

Parison densities, bottle densities, weight, top load performance, and bottle side wall thicknesses of insulative cellular non-aromatic polymeric material formulations formed at different RPM levels.

| Run [#] | RPM | Parison Density [g/cc] | Container Density [g/cc] | Weight [g] | Thickness [mils] | Top Load [lbs-F] | Drop Test [Pass] |
|---|---|---|---|---|---|---|---|
| 9.4.5 | 48 | 0.711 | 0.892 | 54.5 | 41.2 | 87.562 | 100% |
| 9.4.1 | 36 | 0.660 | 0.842 | 50.2 | 37.7 | 92.696 | 100% |
| 9.4.1A | 36 | 0.638 | 0.780 | 51.5 | 43.6 | 89.578 | 100% |
| 9.4.2 | 27 | 0.577 | 0.817 | 53.4 | 42.1 | 105.806 | 100% |
| 9.4.3 | 18 | 0.495 | 0.756 | 45.0 | 37.0 | 73.94 | 20% |
| 9.4.4 | 11 | 0.396 | 0.601 | 32.0 | 30.7 | 36.764 | 0% |

EXAMPLE 19

Formulations

Outer-layer formulation 44 comprised about 95% to about 100% Marlex® HHM 5502BN HDPE (available from Chevron Phillips Chemical Company) and about 0% to about 5% COLORTECH® 11933-19 Titanium Oxide Colorant (available from COLORTECH® a PPM Company) Inner-layer formulation 40 comprised about 100% Marlex® HHM 5502BN HDPE (available from Chevron Phillips Chemical Company).

Core-layer formulation 48 comprised about 100% Marlex® HHM 5502BN HDPE (available from Chevron Phillips Chemical Company) as a first material of a polyethylene base resin. EQUISTAR® ALATHON® H5520 HDPE copolymer (available from Lyondell Chemical Company), electron beam modified to have long-chain branching and a melt index of about 0.75 g/10 min, was used as a second material of the polyethylene base resin. The polyethylene base resin was blended with HYDROCEROL® CF 40E as a chemical blowing agent and Heritage Plastics HT6000 LLDPE talc as another nucleating agent. N₂ was used as a blowing agent.

The blowing agent, N₂, was injected into the molten formulation at levels between about 0.02 lbs/hr to about 0.15 lbs/hour to expand the molten formulation and reduce the density of the mixture of polymer and nucleating agent. The resulting expanded formulation was then extruded through a die head to establish a core-layer parison. Inner and outer layers were extruded through the die head, locating the expanded formulation therebetween, to form a multi-layer tube. The multi-layer tube was molded to form a container according to the present disclosure.

TABLE 24

Comparison of different insulative cellular non-aromatic polymeric material formulations of Example 19.

| Sample ID | Core Layer | | | | Outer | | Inside | Process |
|---|---|---|---|---|---|---|---|---|
| | Chevron | Alathon | CBA | HT6000 | Chevron | Color | Chevron | N2 [kg/hr] |
| 10.A | 100% | 0% | 0% | 0% | 100% | 0% | 100% | 0 |
| 10.B | 98.75% | 0% | 0.75% | 0.50% | 100% | 0% | 100% | 0.017 |
| 10.C | 79.20% | 19.80% | 0.50% | 0.50% | 100% | 0% | 100% | 0.011 |
| 10.E | 0% | 0% | 0% | 0% | 100% | 0% | 100% | 0 |

TABLE 24-continued

Comparison of different insulative cellular non-aromatic polymeric material formulations of Example 19.

| | Core Layer | | | | Outer | | Inside | Process |
|---|---|---|---|---|---|---|---|---|
| Sample ID | Chevron | Alathon | CBA | HT6000 | Chevron | Color | Chevron | N2 [kg/hr] |
| 10.F | 0% | 0% | 0% | 0% | 95% | 5% | 100% | 0 |
| 10.G | 99.20% | 0% | 0.20% | 0.60% | 95% | 5% | 100% | 0.011 |
| 10.H | 99.20% | 0% | 0.20% | 0.60% | 100% | 0% | 100% | 0.007 |

EXAMPLE 20

Densities, Weights, and Layer Thicknesses for Formulations of Example 19

Multi-layer containers formed according to Table 24 were subjected to a series of measurements including container the average of several density measurements, weight measurements (ρ), and thickness measurements. The results are shown below in Table 25.

Density was determined by the apparatus and methods described in Example 2.

TABLE 25

Densities, weights, top load performance, and layer thicknesses of insulative cellular non-aromatic polymeric material formulations of Example 19.

| Sample ID | Weight [g] | ρ [g/cc] | Core [mil] | Outer [mil] | Inner [mil] |
|---|---|---|---|---|---|
| 10.A | 45.1 | 0.916 | 43.2 | * | * |
| 10.B | 35.9 | 0.735 | 36.9 | 4.3 | 5.1 |
| 10.C | 36.0 | 0.712 | 38.0 | 4.4 | 4.6 |
| 10.E | 22.9 | 0.938 | 36.9 | * | * |
| 10.F | 23.2 | 0.941 | 37.5 | * | * |
| 10.G | 16.0 | 0.649 | 26.3 | 3.7 | 4.9 |
| 10.H | 16.9 | 0.638 | 27.7 | 4.7 | 3.2 |

* Data not available

EXAMPLE 21

Rigidity Test
General Procedure

Rigidity testing determines how resistant containers are to deformation. Various multi-layer containers 10 in accordance with the present disclosure were subjected to rigidity testing. Each multi-layer container was placed in a rigidity tester as shown in FIG. 16 and tested to determine rigidity as shown below in Table 3. Testing involved placing a multi-layer container in a rigidity tester 300 as shown in FIG. 16 in two orientations. The rigidity tester included a stationary cylindrical stop 302 on a left side and a movable anvil 304 and force gauge 306 on a right side. The movable anvil was generally T-shaped as shown in FIG. 16. For each orientation, side wall 90 of multi-layer container 10 was deformed about midway between floor 88 and neck 92 of multi-layer container 10. Side wall 90 was deformed about 0.25 inches over a 10 second interval and the force required to do so was recorded in pounds-Force. The first orientation placed a mold seam of multi-layer container in alignment to engage movable anvil 304 (0 Degrees). The second orientation rotated multi-layer container 10 so that the seam was about 90 degrees away from the movable anvil (90 Degrees). The second orientation is reported for rigidity measurements herein.

EXAMPLE 22

Top Load Performance, Rigidity, and Drop Test Results for Formulations of Example 19

Multi-layer containers formed according to Table 24 were subjected to a series of measurements and performance tests including top load force performance measurements, rigidity measurements, and drop testing. The results are shown below in Table 25.

Drop tests were conducted by methods described in Example 6. Top load performance was measured by methods described in Example 7. Rigidity was measured by methods described in Example 21.

TABLE 26

Drop Test Results, Rigidity, and Top Load Performance of insulative cellular non-aromatic polymeric material formulations of Example 19.

| Sample ID | Drop [#/10] | Rigidity [kg-F] | Top Load [lbF] |
|---|---|---|---|
| 10.A | 100% | 1.879 | 62.3 |
| 10.B | 100% | 1.145 | 63.0 |
| 10.C | 100% | 1.208 | 58.7 |
| 10.E | 100% | 1.096 | 104.4 |
| 10.F | 100% | 1.086 | 98.6 |
| 10.G | 100% | 0.817 | 58.6 |
| 10.H | 100% | 0.921 | 63.9 |

EXAMPLE 23

Formulations

Outer-layer formulation 44 comprised about 75% to about 100% Marlex® HHM 5502BN HDPE (available from Chevron Phillips Chemical Company), about 5% COLORTECH® 11933-19 Titanium Oxide Colorant (available from COLORTECH® a PPM Company), and about 0% to about 20% Hyperform® HPR-803i (available from Milliken Chemical) as a reinforcing fiber Inner-layer formulation 40 comprised about 85% to 100% Marlex® HHM 5502BN HDPE (available from Chevron Phillips Chemical Company) and about 0% to about 20% Hyperform® HPR-803i (available from Milliken Chemical) as a reinforcing fiber.

Core-layer formulation 48 comprised about 98% to about 100 Marlex® HHM 5502BN HDPE (available from Chevron Phillips Chemical Company) which was used as a polyethylene base resin. The polyethylene base resin was blended with HYDROCEROL® CF 40E as a chemical blowing agent and nucleating agent and Heritage Plastics HT6000 LLDPE talc as another nucleating agent. $N_2$ was used as a blowing agent.

The blowing agent, $N_2$, was injected into the molten formulation at levels between about 11 kg/hour to expand the molten formulation and reduce the density of the mixture of polymer and nucleating agent. The resulting expanded formulation was then extruded through a die head to establish a core-layer parison Inner and outer layers were extruded through the die head, locating the expanded formulation therebetween, to form a multi-layer tube. The multi-layer tube was molded to form a container according to the present disclosure.

TABLE 27

Comparison of different insulative cellular non-aromatic polymeric material formulations of Example 23.

| Trial ID | Core Layer | | | Outer | | | Inside | |
|---|---|---|---|---|---|---|---|---|
| | Chevron | CBA | HT6000 | Chevron | Color | Fiber | Chevron | Fiber |
| Control | 100% | 0% | 0% | 95% | 5% | 0% | 100% | 0% |
| DOE 1-1 | 100% | 0.10% | 0.30% | 95% | 5% | 0% | 100% | 0% |
| DOE 1-2 | 100% | 0.10% | 0.30% | 95% | 5% | 0% | 100% | 0% |
| DOE 1-3 | 100% | 0.10% | 0.30% | 95% | 5% | 0% | 100% | 0% |
| DOE 1-4 | 98.4% | 0.10% | 1.50% | 95% | 5% | 0% | 100% | 0% |
| DOE 1-5 | 98.4% | 0.10% | 1.50% | 95% | 5% | 0% | 100% | 0% |
| DOE 1-6 | 98.4% | 0.10% | 1.50% | 95% | 5% | 0% | 100% | 0% |
| DOE 1-7 | 99.2% | 0.50% | 0.30% | 95% | 5% | 0% | 100% | 0% |
| DOE 1-8 | 99.2% | 0.50% | 0.30% | 95% | 5% | 0% | 100% | 0% |
| DOE 1-9 | 99.2% | 0.50% | 0.30% | 95% | 5% | 0% | 100% | 0% |
| DOE 1-10 | 98.0% | 0.50% | 1.50% | 95% | 5% | 0% | 100% | 0% |
| DOE 1-10A (Dual Fiber) | 98.0% | 0.50% | 1.50% | 80% | 5% | 15% | 85% | 15% |
| DOE 1-11 | 98.0% | 0.50% | 1.50% | 95% | 5% | 0% | 100% | 0% |
| DOE 1-12 | 98.0% | 0.50% | 1.50% | 95% | 5% | 0% | 100% | 0% |
| DOE 1-1 10% | 99.6% | 0.10% | 0.30% | 85% | 5% | 10% | 100% | 0% |
| DOE 1-1 15% | 99.6% | 0.10% | 0.30% | 80% | 5% | 15% | 100% | 0% |
| DOE 1-1 20% | 99.6% | 0.10% | 0.30% | 75% | 5% | 20% | 100% | 0% |

EXAMPLE 24

Densities, Weights, Layer Thicknesses, and Visual Scores for Formulations of Example 23

Multi-layer containers formed according to Table 27 were subjected to a series of measurements including visual score (determined according to Example 30), container density (ρ) measurements, weight measurements, and thickness measurements. The results are shown below in Table 28.

Density was determined by the apparatus and methods described in Example 2.

TABLE 28

Visual score, densities, Weight, Top Load Performance, and Layer Thicknesses of insulative cellular non-aromatic polymeric material formulations of Example 23.

| Trial ID | Average Visual Score Max 12 | Physical | | Wall Thickness | | |
|---|---|---|---|---|---|---|
| | | Weight [g] | Density [g/cc] | Avg. [mils] | Min [mils] | Max [mils] |
| Control | 12 | 23.0 | 0.934 | 0.032 | 0.019 | 0.044 |
| DOE 1-1 | 11.35 | 17.1 | 0.710 | 0.039 | 0.025 | 0.062 |
| DOE 1-2 | 11.65 | 16.9 | 0.734 | 0.032 | 0.021 | 0.056 |
| DOE 1-3 | 11.25 | 17.1 | 0.760 | 0.030 | 0.022 | 0.055 |
| DOE 1-4 | 11.4 | 17.7 | 0.644 | 0.036 | 0.025 | 0.064 |
| DOE 1-5 | 11.35 | 17.2 | 0.685 | 0.033 | 0.022 | 0.057 |
| DOE 1-6 | 11.5 | 16.8 | 0.744 | 0.030 | 0.020 | 0.050 |
| DOE 1-7 | 10.35 | 17.4 | 0.612 | 0.037 | 0.025 | 0.065 |
| DOE 1-8 | 10.8 | 17.3 | 0.697 | 0.034 | 0.023 | 0.059 |
| DOE 1-9 | 10.9 | 17.1 | 0.760 | 0.030 | 0.021 | 0.052 |
| DOE 1-10 | 10.7 | 17.0 | 0.625 | 0.038 | 0.024 | 0.060 |
| DOE 1-10A | 11.25 | 17.0 | 0.479 | 0.047 | 0.031 | 0.070 |
| DOE 1-11 | 10.5 | 17.1 | 0.693 | 0.032 | 0.021 | 0.051 |
| DOE 1-12 | 11.6 | 17.5 | 0.784 | 0.029 | 0.022 | 0.044 |
| DOE 1-1 10% | 10.8 | 17.0 | 0.624 | 0.040 | 0.018 | 0.063 |
| DOE 1-1 15% | 10.3 | 17.5 | 0.656 | 0.034 | 0.020 | 0.056 |
| DOE 1-1 20% | 9 | 17.1 | 0.665 | 0.034 | 0.023 | 0.055 |

EXAMPLE 25

Top Load Performance, Rigidity, Drop Test Results, and Cap Application and Removal for Formulations of Example 23

Multi-layer containers formed according to Table 27 were subjected to a series of measurements and performance tests including top load force performance measurements, rigidity measurements, drop testing, and cap application and removal. The results are shown below in Table 29.

Drop tests were conducted by methods described in Example 6. In some examples, the method described in Example 6 was followed with the exception of replacing water with shampoo. Top load performance was measured by methods described in Example 7. In some examples, the method described in Example 7 was performed with a container that was closed with a cap. In other examples, the method in Example 7 was performed with a container without a cap. Rigidity was measured by methods described in Example 21. The forces required to remove and apply caps to the containers were measured. Containers having caps were subjected to application and removal testing based on ASTM D3473-88 (Standard Test Methods for Lifting Force Required to Remove Certain Child-Resistant Snap Caps) and ASTM D3480-88 (Standard Test Methods for Downward Force Required to Open or Activate Child-Resistant Snap-Engagement Packages), each of which is incorporated by reference herein in its entirety.

TABLE 29

Drop test results, rigidity, top load performance, and cap application and removal of insulative cellular non-aromatic polymeric material formulations of Example 23.

| Trial ID | Water Drop | Rigidity [kg-F] | Top Load Uncapped [N] | Top Load Capped [N] | Cap Removal [lb-f] | Cap Removal [N] | Cap Application [lb-f] | Cap Application [N] |
|---|---|---|---|---|---|---|---|---|
| Control | 100% | 1.82 | 343 | 495 | 26 | 117 | 20 | 91 |
| DOE 1-1 | 70% | 1.43 | 184 | * | 17 | 74 | 20 | 89 |
| DOE 1-2 | 80% | 1.04 | 162 | * | 16 | 73 | 27 | 118 |
| DOE 1-3 | 70% | 0.90 | 149 | * | 18 | 79 | 25 | 113 |
| DOE 1-4 | 90% | 1.28 | 194 | * | 17 | 76 | 22 | 100 |
| DOE 1-5 | 100% | 1.01 | 167 | 243 | 17 | 77 | 25 | 109 |
| DOE 1-6 | 80% | 0.88 | 150 | * | 18 | 79 | 28 | 125 |
| DOE 1-7 | 60% | 1.16 | 180 | * | 18 | 81 | 26 | 114 |
| DOE 1-8 | 100% | 1.07 | 167 | 239 | 18 | 79 | 28 | 125 |
| DOE 1-9 | 100% | 0.88 | 151 | * | 17 | 74 | 21 | 95 |
| DOE 1-10 | 100% | 1.32 | 197 | 271 | 18 | 79 | 24 | 107 |
| DOE 1-10A | 60% | 1.87 | 245 | * | 17 | 77 | 22 | 96 |
| DOE 1-11 | 100% | 0.99 | 173 | 260 | 18 | 78 | 26 | 116 |
| DOE 1-12 | 100% | 0.88 | 165 | * | 18 | 79 | 24 | 106 |
| DOE 1-1 10% | 100% | 1.34 | 209 | 309 | 18 | 79 | 26 | 116 |
| DOE 1-1 15% | 90% | 1.15 | 207 | * | 19 | 85 | 36 | 161 |

* Data not available

EXAMPLE 30

Visual Score

General Procedure

Containers were given scores based on a set of twelve observable factors. Each time a container lacked an observable factor, one point was awarded. Thus, a container lacking all observable factors obtained a best score of 12. The observable factors included: 1) presence of holes, 2) the presence of foreign material, 3) whether the container was malformed, 4) engraving on the container, 5) undesirable appearance of the container, 6) undesirable color of the container, 7) presence of odor in the container, 8) neck top of the container lacking smoothness, 9) neck bore of the container lacking smoothness, 10) whether the container had a rocker bottom defect, 11) undesirable finish quality, and 12) undesirable parting line. In some examples, several containers were formed, tested, and the scores were averaged.

The invention claimed is:

1. A method of producing a multilayer vessel, the method comprising the steps of
extruding an inner parison, an outer parison, and a core parison,
aligning the inner parison, the core parison, and the outer parison to cause the core parison to be located between the inner parison and the outer parison to cause the core parison to surround the inner parison and to be surrounded by the outer parison to form a multilayer tube,
placing the multilayer tube in a mold cavity formed in a mold, and
expanding the multilayer tube to cause the outer parison to engage an inner surface of the mold and cause the multilayer tube to deform to create a multilayer vessel having an interior region, wherein the expanding step includes inserting a blow needle into a tube space formed in the multi-layer tube and pumping pressurized gas into the tube space to compress the core parison against the inner surface until the multilayer vessel is established,
wherein the core parison comprises an insulative cellular non-aromatic polymeric material.

2. The method of claim 1, further comprising the step of applying a vacuum in a range of about 5 millimeters Hg to about 25 millimeters Hg to the mold cavity during the expanding step whereby the outer parison engages with the inner surface of the mold.

3. The method of claim 2, wherein the vacuum is in a range of about 20 millimeters Hg to the mold cavity during the expanding step.

4. The method of claim 1, wherein the pressurized gas has a pressure in a range of about 10 pounds per square inch to about 130 pounds per square inch.

5. The method of claim 4, wherein the pressurized gas has a pressure in a range of about 30 pounds per square inch to about 50 pounds per square inch.

6. The method of claim 5, wherein the pressurized gas has a pressure of about 40 pounds per square inch.

7. The method of claim 1, wherein the pressurized gas has a temperature up to about 200 degrees Fahrenheit.

8. The method of claim 7, wherein the pressurized gas has a temperature in a range of about 35 degrees Fahrenheit to about 75 degrees Fahrenheit.

9. The method of claim 8, wherein the pressurized gas has a temperature of about 50 degrees Fahrenheit.

10. The method of claim 9, wherein the blow-up ratio in a range of about 100% to about 300%.

11. The method of claim 10, wherein the blow-up ratio in a range of about 150% to about 200%.

12. The method of claim 1, wherein the multi-layer container has an average collapse force of in a range of about 50 pounds-Force to about 400 pounds-Force.

13. The method of claim 12, wherein the average collapse force is in a range of about 100 pounds-Force to about 250 pounds-Force.

14. The method of claim 13, wherein the average collapse force is in a range of about 115 pounds-Force to about 170 pounds-Force.

15. The method of claim 1, wherein the core parison is formed by extruding a core-layer formulation of polymeric material.

\* \* \* \* \*